(12) United States Patent  
Namekata

(10) Patent No.: US 9,207,489 B2
(45) Date of Patent: Dec. 8, 2015

(54) METHOD OF MANUFACTURING OPTICAL MEMBER

(75) Inventor: Yuuki Namekata, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 556 days.

(21) Appl. No.: 13/643,196

(22) PCT Filed: Mar. 10, 2011

(86) PCT No.: PCT/JP2011/055592
§ 371 (c)(1),
(2), (4) Date: Oct. 24, 2012

(87) PCT Pub. No.: WO2011/145384
PCT Pub. Date: Nov. 24, 2011

(65) Prior Publication Data
US 2013/0043608 A1     Feb. 21, 2013

(30) Foreign Application Priority Data

May 20, 2010   (JP) .................................. 2010-116630

(51) Int. Cl.
| | |
|---|---|
| *B29D 11/00* | (2006.01) |
| *G02F 1/1335* | (2006.01) |
| *G02B 1/12* | (2006.01) |
| *G02B 5/02* | (2006.01) |
| *G02B 5/04* | (2006.01) |

(52) U.S. Cl.
CPC .... *G02F 1/133603* (2013.01); *B29D 11/00798* (2013.01); *G02B 1/12* (2013.01); *G02B 5/0226* (2013.01); *G02B 5/045* (2013.01); *G02F 1/133606* (2013.01); *G02F 2001/133624* (2013.01)

(58) Field of Classification Search
None
See application file for complete search history.

(56) References Cited

FOREIGN PATENT DOCUMENTS

JP         2010-044219 A      2/2010

OTHER PUBLICATIONS

Official Communication issued in International Patent Application No. PCT/JP2011/055592, mailed on May 17, 2011.

*Primary Examiner* — Barbara J Musser
(74) *Attorney, Agent, or Firm* — Keating & Bennett, LLP

(57) ABSTRACT

The purpose of the present invention is to make a change in the chromaticity of an optical member due to use unlikely to occur. A method of manufacturing a prism sheet 23c as an optical member 23 to be used in a backlight unit 12 that supplies light to a liquid crystal panel 11 and transmits light from LEDs 24 as light sources of the backlight unit 12, includes a step of stabilizing the chromaticity of transmitted light by irradiation with light from chromaticity stabilizing LEDs 32 as chromaticity stabilizing light sources having a dominant emission wavelength in a blue wavelength region.

19 Claims, 23 Drawing Sheets

FIG.1
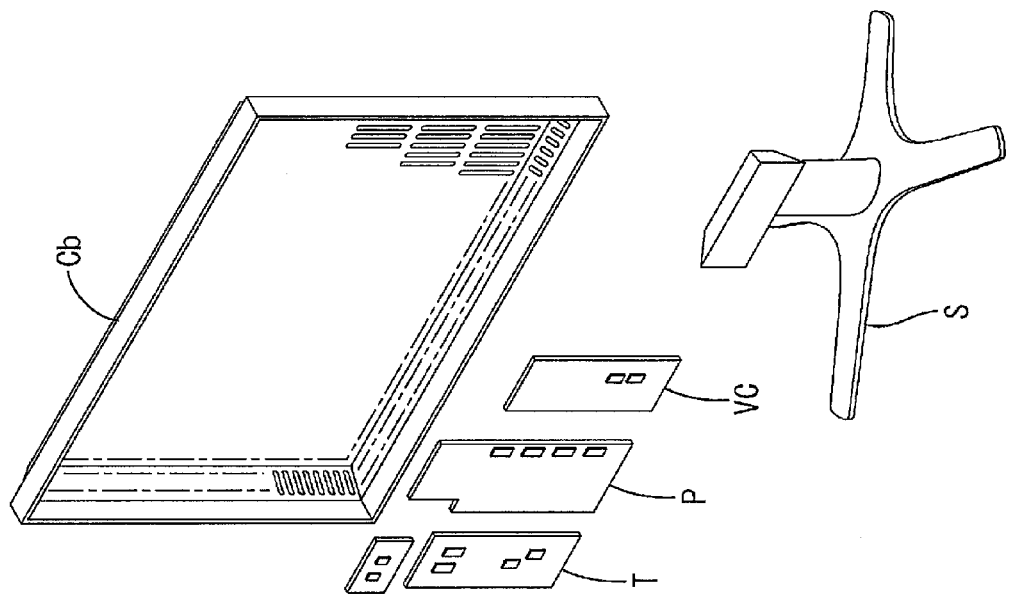
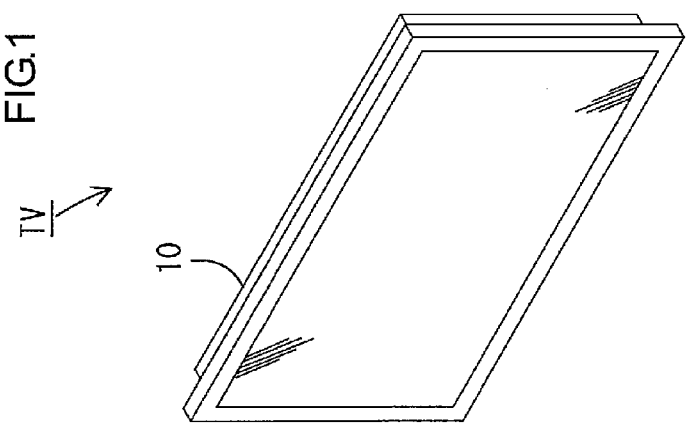
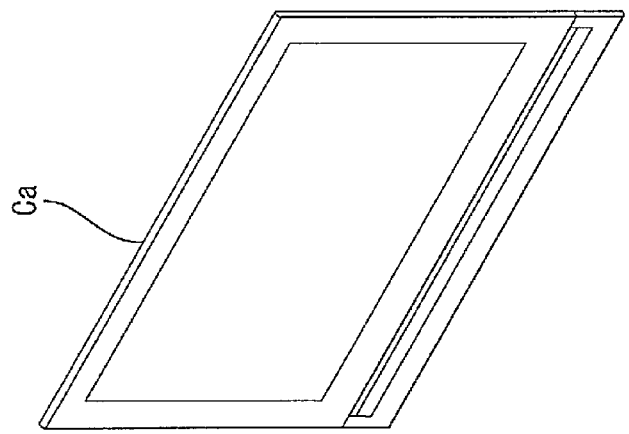

FIG.2
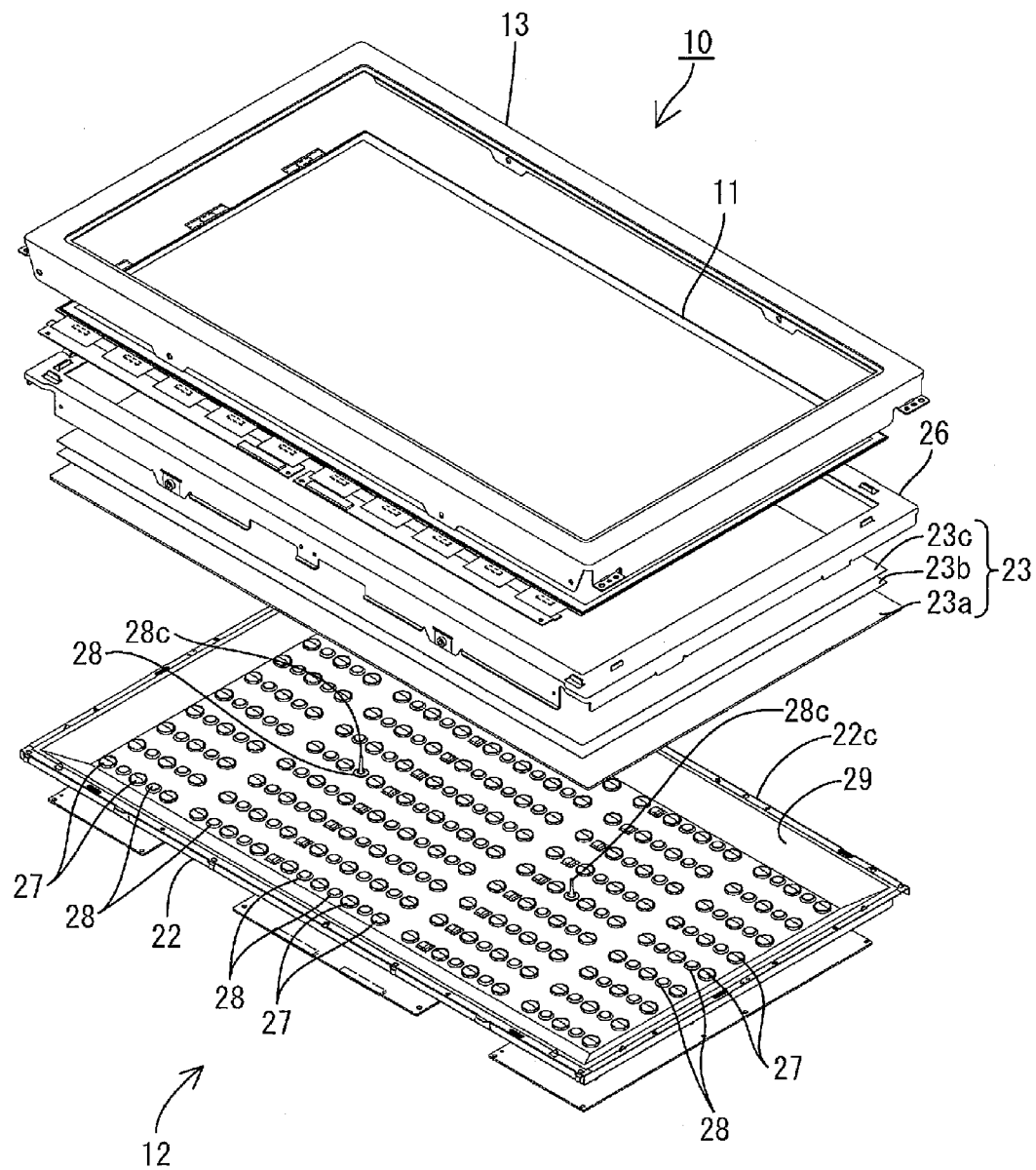
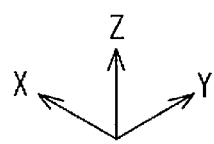

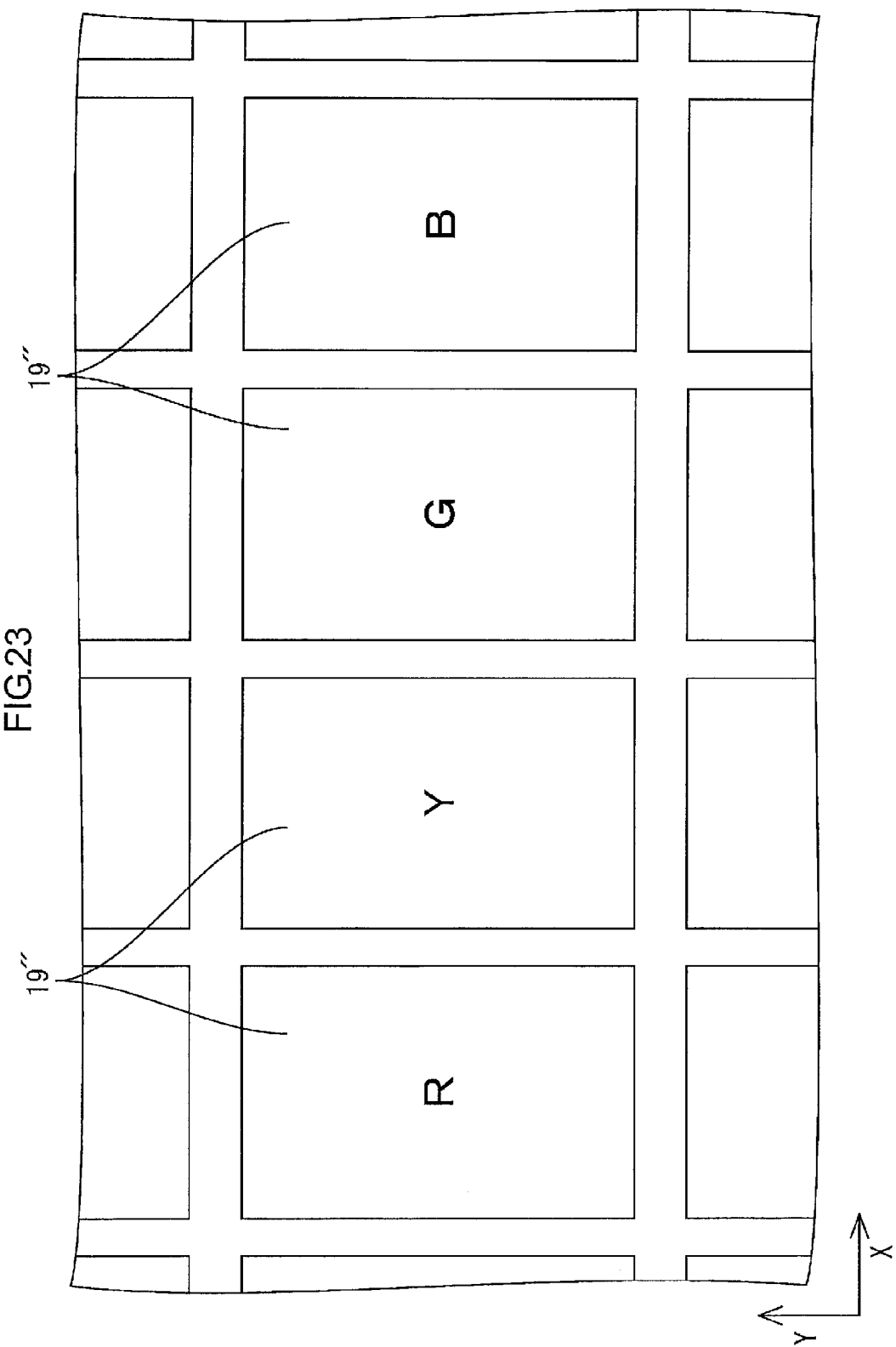

METHOD OF MANUFACTURING OPTICAL MEMBER

TECHNICAL FIELD

The present invention relates to a method of manufacturing an optical member.

BACKGROUND ART

A liquid crystal panel used in a liquid crystal display device, such as a liquid crystal television set, does not emit light by itself. Thus, the liquid crystal panel uses a backlight unit as a separate lighting device. The backlight unit is installed on the rear side (opposite to the display surface) of the liquid crystal panel, and provided with a chassis with an opening on the liquid crystal panel side; a light source housed in the chassis; and optical members disposed in the opening of the chassis in an opposed manner with respect to the light source and converting the light from light source into planar light to output the light toward the liquid crystal panel, for example.

The optical members of the backlight unit causes the light from the light source to be output toward the liquid crystal panel while providing the light with a predetermined optical effect based on the type of the optical members. For example, a prism sheet collects light from the light source, and a diffuser sheet diffuses light from the light source. An example of the backlight unit including such optical members is described in the following Patent Document 1.

Patent Document 1: Japanese Unexamined Patent Publication No. 2010-44219

Problem to be Solved by the Invention

The optical characteristics of the optical members may be varied by use, depending on the type of material of the constituent parts of the optical members or the environment in which the backlight unit is used. As a result, the chromaticity of the transmitted light may be shifted over time. When there is such a chromaticity shift in the light transmitted through the optical members, a tinge of color of the image displayed on the liquid crystal display device may be gradually changed over time of use, possibly resulting in a decrease in display quality. This problem of chromaticity shift in the transmitted light through the optical members has not been sufficiently analyzed.

DISCLOSURE OF THE PRESENT INVENTION

The present invention was made in view of the foregoing circumstances, and an object of the present invention is to make a change in chromaticity due to use unlikely to occur.

Means for Solving the Problem

According to the present invention, a method of manufacturing an optical member to be used in a lighting device supplying light to a display panel and transmitting light from a light source included in the lighting device, includes stabilizing chromaticity of light transmitted through the optical member by irradiation with light having a dominant emission wavelength in a blue wavelength region that is emitted from a chromaticity stabilizing light source.

If the optical member is manufactured without the chromaticity stabilizing step, if the manufactured optical member is assembled and used in the lighting device irradiating the display panel with light, the optical characteristics of the optical member may be changed such that the chromaticity of the color of white of the transmitted light is gradually shifted toward blue as the optical member is irradiated with the light in the blue wavelength region from the light source of the lighting device. As a result, a tinge of color of the displayed image may be changed over time, possibly resulting in decrease in display quality, for example.

According to the present invention, when the optical member is manufactured, in the chromaticity stabilizing step, the optical characteristics of the optical member is changed by irradiation with the light having the dominant emission wavelength in the blue wavelength region from the chromaticity stabilizing light source such that the chromaticity of the transmitted light through the optical member can be shifted toward blue. Namely, a change in the optical characteristics of the optical member used in the lighting device is promoted during the manufacturing process such that the chromaticity of the color of white of the transmitted light is shifted toward blue in advance, whereby the chromaticity of the transmitted light can be stabilized. Thus, a change in the chromaticity is unlikely to occur when the optical member is assembled and used in the lighting device. Accordingly, when the optical member is used in the lighting device, the tinge of color of the displayed image on the display panel is not changed over time, leading to excellent display quality. In addition, because the light from the chromaticity stabilizing light source has the dominant emission wavelength in the blue wavelength region, the change in the optical characteristics of the optical member can be efficiently promoted, whereby time required for the chromaticity stabilizing step can be decreased, providing excellent manufacturing efficiency.

Preferred embodiments of the present invention may include the following.

(1) In the chromaticity stabilizing step, the light having the dominant emission wavelength in the blue wavelength region that is emitted from the chromaticity stabilizing light source may have an emission intensity relatively higher than an emission intensity of a light source included in the lighting device. In this way, the optical irradiation time necessary for stabilizing the chromaticity of the transmitted light through the optical member in the chromaticity stabilizing step can be decreased as the emission intensity of the light in the blue wavelength region is increased. Thus, time required for the chromaticity stabilizing step can be decreased compared with the case where the same light source of the lighting device is used as the chromaticity stabilizing light source.

(2) In the chromaticity stabilizing step, the dominant emission wavelength of the chromaticity stabilizing light source may be same as a dominant emission wavelength of the light source included in the lighting device. In this way, the optical characteristics of the optical member can be more appropriately changed in the chromaticity stabilizing step. Thus, when the manufactured optical member is assembled and used in the lighting device, the tinge of color of the displayed image on the display panel can be more appropriate. Accordingly, extremely high display quality can be obtained.

(3) In the chromaticity stabilizing step, the chromaticity stabilizing light source may emit substantially single color light of blue. In this way, the optical member can be irradiated with the light in the blue wavelength region in an extremely efficient manner in the chromaticity stabilizing step. As a result, the optical irradiation time necessary for stabilizing the chromaticity of the transmitted light through the optical member can be decreased in the chromaticity stabilizing step. Thus, time required for the chromaticity stabilizing step can be further decreased.

(4) In the chromaticity stabilizing step, the chromaticity stabilizing light source may be a chromaticity stabilizing LED having a LED element emitting the substantially single color light of blue. In this way, the optical member can be irradiated with the substantially single color light of blue with extremely high color purity from the LED element of the chromaticity stabilizing LED in the chromaticity stabilizing step. Thus, the time required for the chromaticity stabilizing step can be further decreased.

(5) The method of manufacturing an optical member may further include forming a light transmissive base member of the optical member. In the chromaticity stabilizing step, at least the light transmissive base member may be irradiated with the light from the chromaticity stabilizing light source. This may be suitable in the case where a change in the optical characteristics of the optical member is caused due to the light transmissive base member.

(6) In the base member forming step, the light transmissive base member may be formed from a polyester resin. In this way, the chromaticity of the transmitted light through the light transmissive base member of the polyester resin can be stabilized through the chromaticity stabilizing step.

(7) In the base member forming step, the light transmissive base member may be formed from PET (polyethylene terephthalate). In this way, while PET includes a carbonyl group as the chromophore and the carbonyl group may be a factor causing a change in the optical characteristics, the chromaticity of the transmitted light through the light transmissive base member of PET can be stabilized through the chromaticity stabilizing step.

(8) In the base member forming step, the light transmissive base member may be formed from an AS resin (acrylonitrile-styrene copolymer). In this way, the chromaticity of the transmitted light through the light transmissive base member of the AS resin can be stabilized through the chromaticity stabilizing step.

(9) The method of manufacturing an optical member may further include forming an optical functional layer on the light transmissive base member. The optical functional layer optically affects the light from the light source of the lighting device. In this way, the optical member formed by layering the optical functional layer on the light transmissive base member can be manufactured in a preferred manner.

(10) The chromaticity stabilizing step may be performed after the base member forming step and the functional layer forming step. If the base member forming step and the functional layer forming step are performed successively, performing the chromaticity stabilizing step prior to the functional layer forming step would require a significant modification of the manufacturing apparatus. In this respect, according to the present invention, the chromaticity stabilizing step can be included in the method of manufacturing the optical member without a significant modification of the manufacturing apparatus.

(11) In the chromaticity stabilizing step, the chromaticity stabilizing light source may be disposed to face at least the light transmissive base member. In this way, the light transmissive base member can be irradiated with the light from the chromaticity stabilizing light source efficiently in the chromaticity stabilizing step. Thus, the stabilizing the chromaticity of the transmitted light through the light transmissive base member can be performed in less time.

(12) In the chromaticity stabilizing step, the chromaticity stabilizing light source may be disposed to face the light transmissive base member among the light transmissive base member and the optical functional layer. In this way, because the chromaticity stabilizing light source is disposed to face only one side of the optical member, the cost related to the optical member manufacturing apparatus can be decreased compared with the case where the chromaticity stabilizing light source is disposed to face both sides of the optical member.

(13) The optical functional layer maybe a prism layer that collects the light from the light source of the lighting device. In this case, because the prism layer collects the light transmitting through the optical member, the chromaticity shift of the color of white of the transmitted light toward blue tends to become more conspicuous. In this respect, according to the present invention, the chromaticity of the transmitted light through the optical member is stabilized in advance in the chromaticity stabilizing step. This is extremely useful for the manufacture of the optical member including the prism layer.

(14) The prism layer may be made of a non-halogenated acrylic resin. In this way, the optical member including the prism layer of the non-halogenated acrylic resin can be manufactured in an extremely useful manner.

(15) The optical functional layer may be a diffuser layer diffusing light from the light source of the lighting device. In this way, the optical member including the diffuser layer that diffuses the transmitted light can be manufactured in a preferred manner.

(16) The diffuser layer may be made of an alkyl methacrylate styrene non-copolymer. In this way, the optical member including the diffuser layer of the alkyl methacrylate styrene non-copolymer can be manufactured in a preferred manner.

(17) In the chromaticity stabilizing step, the light from the chromaticity stabilizing light is irradiated to the optical member to be used in the lighting device including the light source configured with a LED having a LED element emitting substantially single color light of blue and a phosphor emitting light upon excitation by the light from the LED element. If the optical member is used in the lighting device having the LED as the light source, the problem of the chromaticity shift of the transmitted light due to a change in the optical characteristics of the optical member may become pronounced because of the substantially single color light of blue with extremely high color purity from the LED element. By stabilizing the chromaticity of the transmitted light through the optical member to be used in such lighting device in the chromaticity stabilizing step, the problem of chromaticity shift can be eliminated in a preferred manner.

(18) In the chromaticity stabilizing step, the light from the chromaticity stabilizing light is irradiated to the optical member used in the lighting device supplying light to the display panel including a pair of substrates sandwiching a substance with optical characteristics variable by application of an electric field, one of the pair of substrates including a color filter with a plurality of color sections respectively exhibiting blue, green, red, and yellow. Because the color filter included in the display panel includes the yellow color section in addition to the respective blue, green, and red color sections, the displayed image on the display panel tends to have a yellowish tinge. In order to avoid this, it is preferable to set the chromaticity of the output light from the light source of the lighting device toward blue that is the complementary color to yellow. However, in this case, the problem of the chromaticity shift of the transmitted light in the optical member may become pronounced as the lighting device is used. The problem of chromaticity shift can be eliminated in a preferred manner by stabilizing the chromaticity of the transmitted light with respect to the optical member to be used in the lighting device supplying light to the display panel in the chromaticity stabilizing step.

Advantageous Effect of the Invention

According to the present invention, a change in chromaticity due to use can be made difficult to occur.

BRIEF DESCRIPTION OF THE DRAWINGS

FIG. 1 is a an exploded perspective view illustrating a schematic configuration of a television receiver according to the first embodiment of the present invention;

FIG. 2 is an exploded perspective view showing a schematic configuration of a liquid crystal display device included in the television receiver;

FIG. 23 is an enlarged plan view showing a planar configuration of a CF substrate according to another embodiment (2) of the present invention.

BEST MODE FOR CARRYING OUT THE INVENTION

<First Embodiment>

Figure 3:
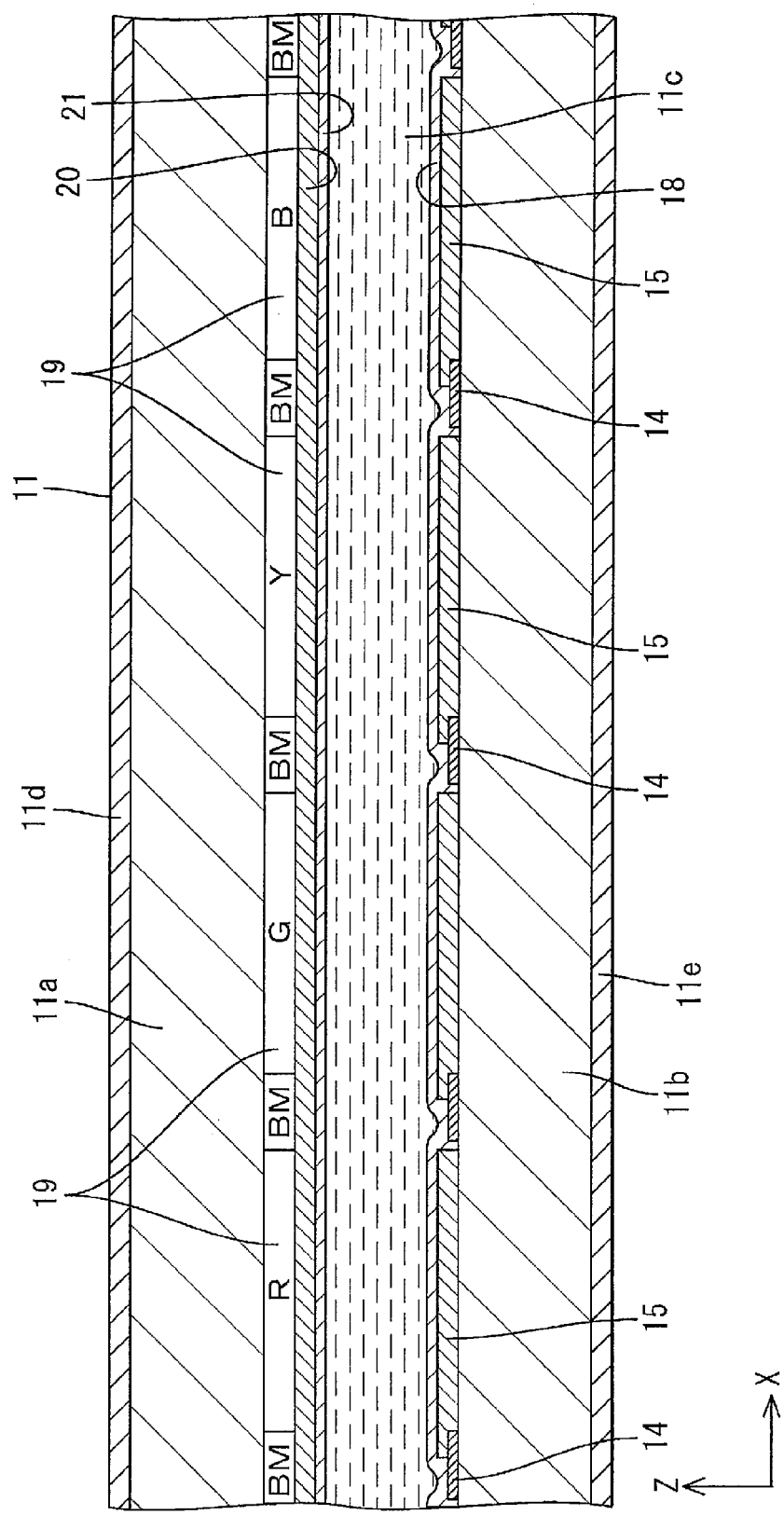
FIG. 3 is a cross sectional view showing a cross sectional configuration of a liquid crystal panel along a long side direction thereof.

A first embodiment of the present invention will be described with reference to FIGS. 1 to 13. According to the present embodiment, a method of manufacturing an optical member 23 (a prism sheet 23c) to be used in a liquid crystal display device 10 will be described. In the following, a configuration of the liquid crystal display device 10 will be described first. In some parts of the drawings, an X-axis, a Y-axis, and a Z-axis are shown as the respective axial directions corresponding to the directions shown in the respective drawings. The upper side and the lower side shown in FIGS. 7 and 8 correspond to the front side and the rear side, respectively.

A television receiver TV according to the present embodiment, as shown in FIG. 1, includes the liquid crystal display device 10; front and rear cabinets Ca and Cb housing the liquid crystal display device 10 in a sandwiching manner; a power supply circuit board P supplying electric power; a tuner (reception unit) T configured to receive a television image signal; an image conversion circuit board VC converting the television image signal output from the tuner T into an image signal for the liquid crystal display device 10; and a stand S. The liquid crystal display device (display device) 10 as a whole has a horizontally long (elongated) square shape (rectangular shape). The liquid crystal display device 10 is housed with its long side direction and short side direction substantially aligned with the horizontal direction (X-axis direction) and the vertical direction (Y-axis direction; perpendicular direction), respectively. The liquid crystal display device 10, as shown in FIG. 2, includes a liquid crystal panel 11 as a display panel and a backlight unit (lighting device) 12 as an external light source, which are integrally held by a frame-shaped bezel 13 or the like.

A configuration of the liquid crystal panel 11 of the liquid crystal display device 10 will be described in detail. The liquid crystal panel 11 as a whole has a horizontally long (elongated) square shape (rectangular shape). As shown in FIG. 3, the liquid crystal panel 11 includes a pair of transparent (light transmissive) glass substrates 11a and 11b, and a liquid crystal layer 11c between the substrates 11a and 11b. The liquid crystal layer 11c includes liquid crystal. The liquid crystal is a substance whose optical characteristics vary by application of an electric field. The substrates 11a and 11b are affixed to each other with a sealing agent, which is not shown, with a gap corresponding to the thickness of liquid crystal layer 11c maintained between the substrates 11a and 11b. To the outer surfaces of the substrates 11a and 11b, polarizing plates 11d and 11e, respectively, are affixed. The liquid crystal panel 11 has a long side direction and a short side direction aligned with the X-axis direction and the Y-axis direction, respectively.

Figure 4:
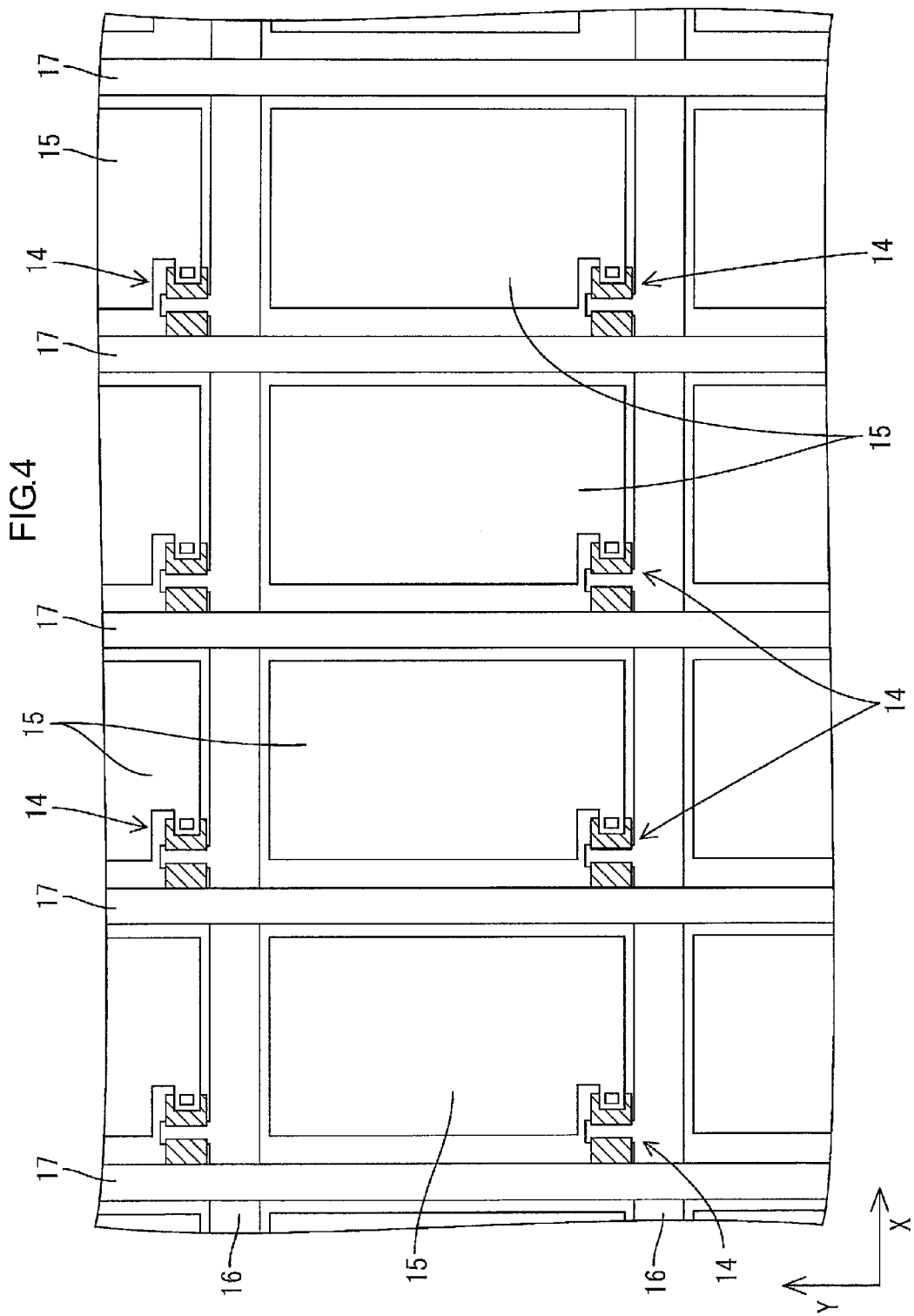
FIG. 4 is an enlarged plan view illustrating a planar configuration of an array substrate.

The front side (front surface side) one of the substrates 11a and 11b is a CF substrate 11a, and the rear side (back surface side) one of the substrates 11a and 11b is an array substrate 11b. On an inner surface of the array substrate 11b, i.e., the surface facing the liquid crystal layer 11c (facing the CF substrate 11a), as shown in FIG. 4, a number of TFTs (Thin Film Transistors) 14 and pixel electrodes 15 as switching elements are arranged side by side in a matrix. Around the TFTs 14 and the pixel electrodes 15, gate wires 16 and source wires 17 are arranged in a lattice shape. The pixel electrodes 15 have a vertically long (elongated) square shape (rectangular shape) with a long side direction and a short side direction aligned with the Y-axis direction and the X-axis direction, respectively. The pixel electrodes 15 may be transparent electrodes of ITO (Indium Tin Oxide) or ZnO (Zinc Oxide). The gate wires 16 and the source wires 17 are connected to the gate electrodes and the source electrodes of the TFTs 14, respectively. The pixel electrodes 15 are connected to the drain electrodes of the TFTs 14. On the side of the TFTs 14 and the pixel electrodes 15 facing the liquid crystal layer 11c, an alignment film 18 aligning the liquid crystal molecules is arranged. At the ends of the array substrate 11b, terminal portions drawn out from the gate wires 16 and the source wires 17 are formed. To the terminal portions, a driver IC, which is not shown, driving the liquid crystal is crimped via an anisotropic conductive film (ACF). The liquid crystal driving driver IC is electrically connected to a display control circuit board, which is not shown, via various wiring boards and the like. The display control circuit board is connected to the image conversion circuit board VC of the television receiver TV to supply a drive signal via the driver IC to the wires 16 and 17 on the basis of an output signal from the image conversion circuit board VC.

Figure 5:
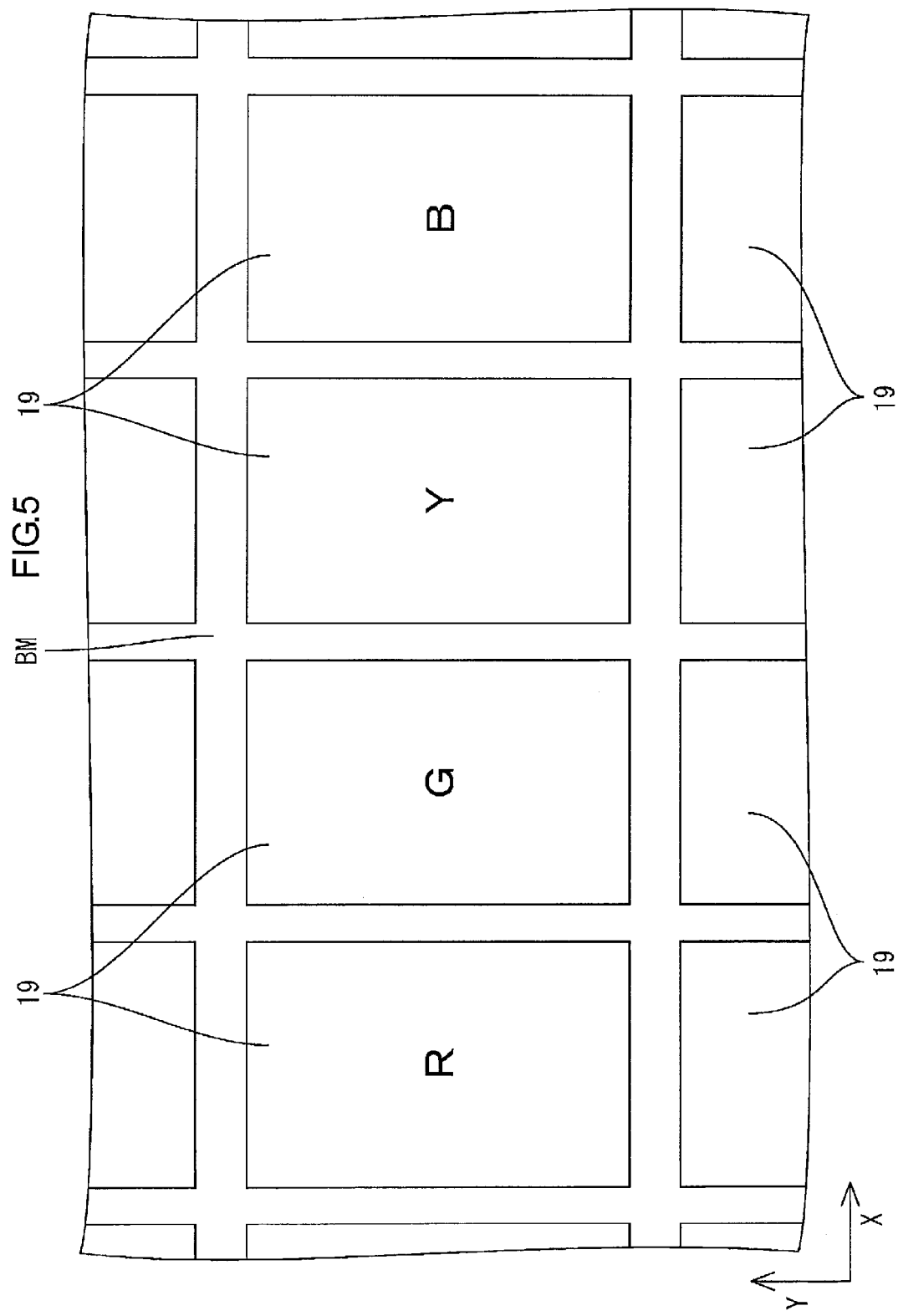
FIG. 5 is an enlarged plan view illustrating a planar configuration of a CF substrate.

On the inner surface of the CF substrate 11a, i.e., on the surface facing the liquid crystal layer 11c (or facing the array substrate 11b), as shown in FIGS. 3 and 5, a color filter 19 is arranged. The color filter 19 includes a plurality of each of color sections R, G, B, or Y arranged in a matrix corresponding to the respective pixels on the array substrate 11b. According to the present embodiment, the color filter 19 includes a yellow color section Y in addition to the red color section R, the green color section G, and the blue color section B of the three primary colors of light. The respective color sections R, G, B, and Y selectively transmit light of the respective corresponding colors (respective wavelengths). In the color filter 19, the red color section R, the green color section G, the yellow color section Y, and the blue color section B are arranged along the x-axis direction in the order from the left side as shown in FIG. 5. The color sections R, G, B, and Y have a vertically long (elongated) square shape (rectangular shape) with a long side direction aligned with the Y-axis direction and a short side direction aligned with the X-axis direction, similar to the pixel electrodes 15. All the color sections have the same area. Between the color sections R, G, B, and Y, a lattice-shaped light blocking layer (black matrix) BM is provided for preventing the mixing of colors. On the side of the color filter 19 on the CF substrate 11a facing the liquid crystal layer 11c, a counter electrode 20 and an alignment film 21 are layered in order.

Thus, according to the present embodiment, the liquid crystal display device 10 has the liquid crystal panel 11 with the color filter 19 including the four color sections R, G, B, and Y. For this reason, the television receiver TV includes the dedicated image conversion circuit board VC. The image conversion circuit board VC is configured to convert the television image signal output from the tuner T into an image signal for the respective colors of blue, green, red, or yellow to output the image signal generated for the respective colors to the display control circuit board. On the basis of the image signals, the display control circuit board drives the TFTs 14 corresponding to the pixel of the respective colors on the liquid crystal panel 11 to appropriately control the amount of light transmitted through the color section R, G, B, or Y of the respective colors.

Next, a configuration of the backlight unit 12 will be described. The backlight unit 12, as shown in FIG. 2, includes a substantially box-shaped chassis 22 with an opening on the light output surface side (toward the liquid crystal panel 11); a group of optical members 23 covering the opening of the chassis 22; and a frame 26 arranged along the outer edges of the chassis 22 and retaining the outer edges of the group of optical members 23 in a sandwiched manner with the chassis 22. The chassis 22 houses LEDs 24 arranged immediately under the optical members 23 (the liquid crystal panel 11) in an opposed manner; LED boards 25 on which the LEDs 24 are mounted; and diffuser lenses 27 attached to the LED boards 25 at positions corresponding to the LEDs 24. Thus, the backlight unit 12 according to the present embodiment is of the so-called direct type. The chassis 22 also houses holding members 28 configured to hold the LED boards 25 between with the chassis 22; and a reflection sheet 29 reflecting the light within the chassis 22 toward the optical members 23. In the following, the constituent components of the backlight unit 12 will be described in detail.

Figure 6:
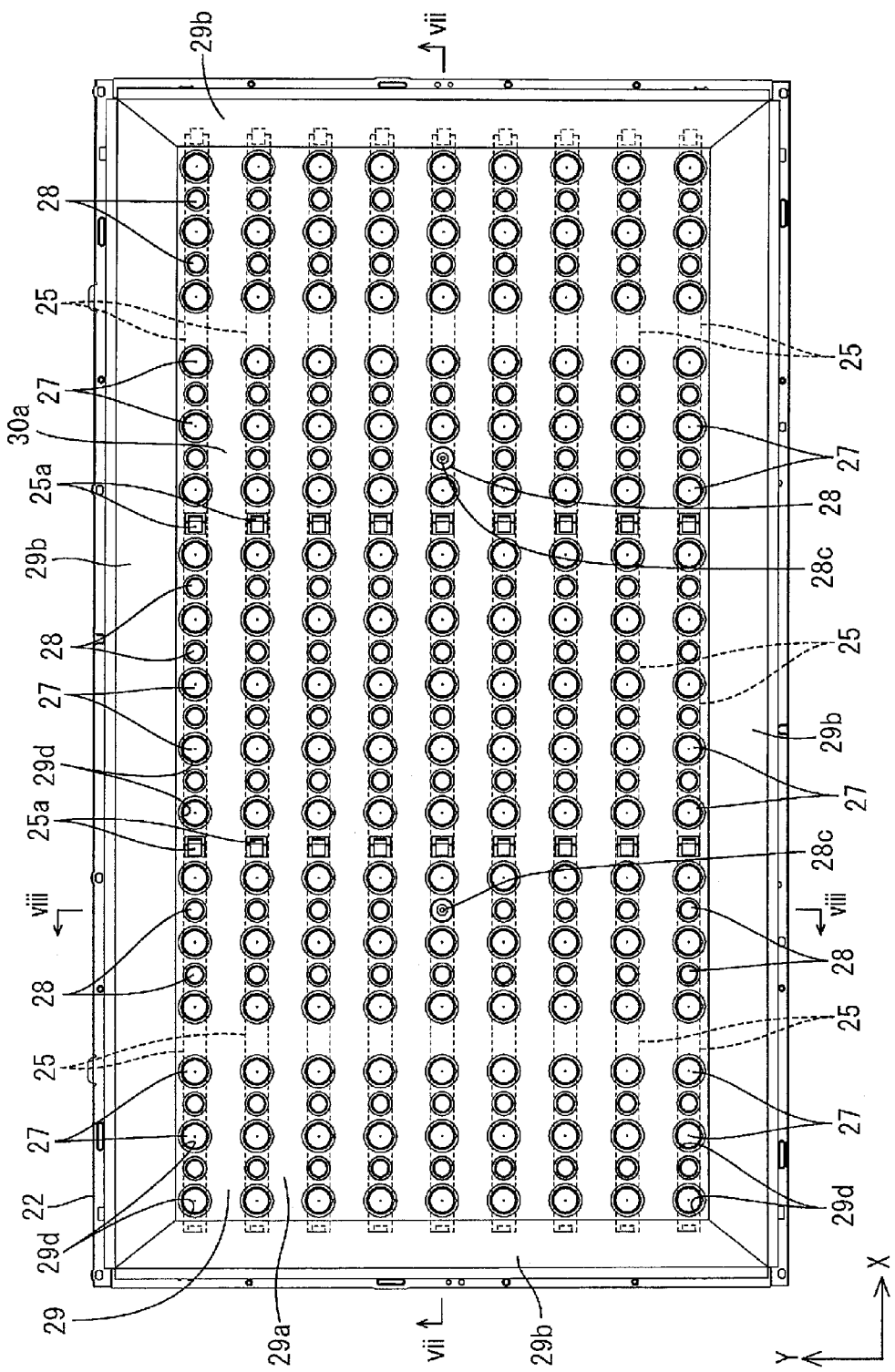
FIG. 6 is a plan view showing an arrangement configuration of diffuser lenses, LED boards, first reflection sheets and holding members in a chassis of a backlight unit.
Figure 7:
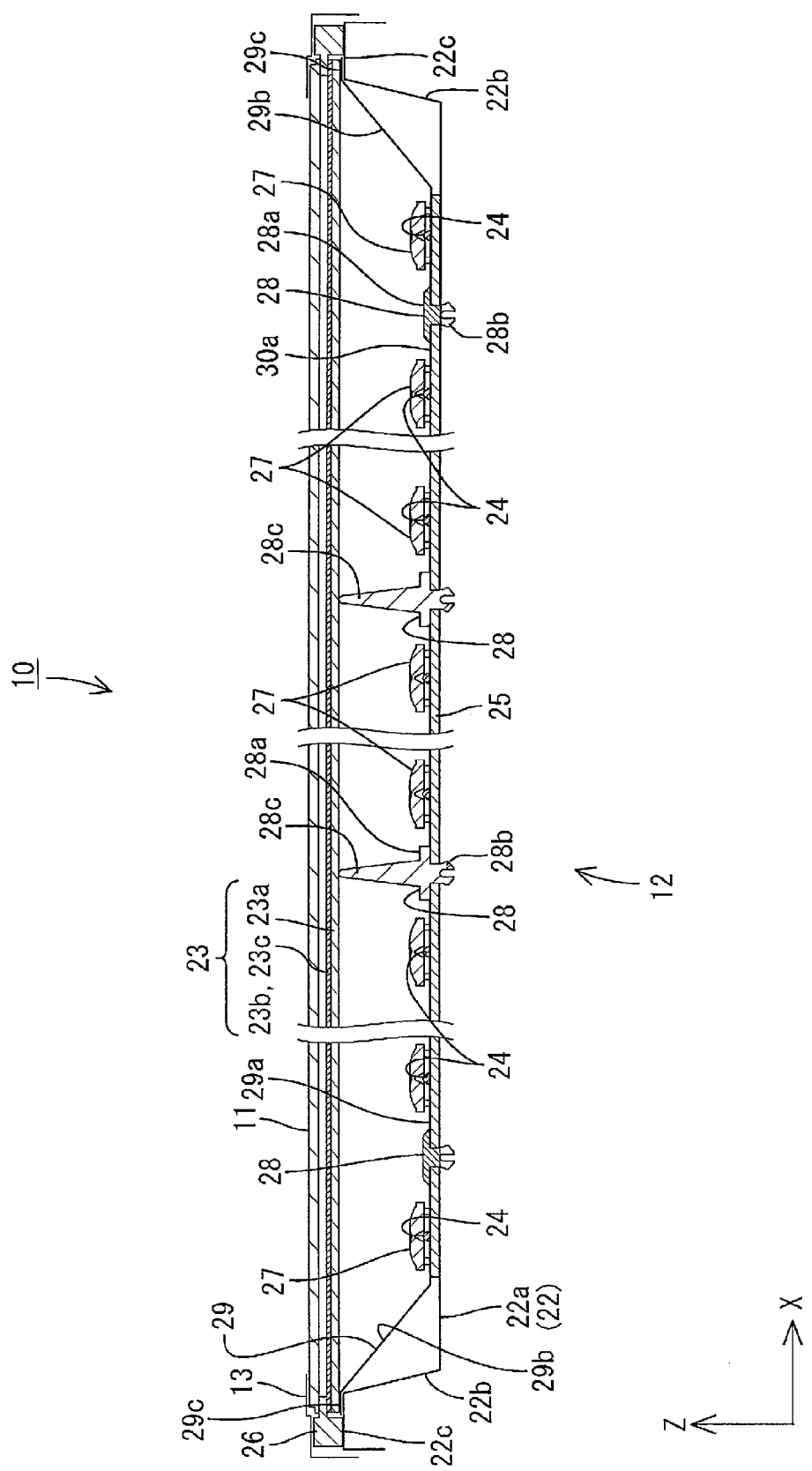
FIG. 7 is a cross sectional view of the liquid crystal display device taken along line vii-vii of FIG. 6.
Figure 8:
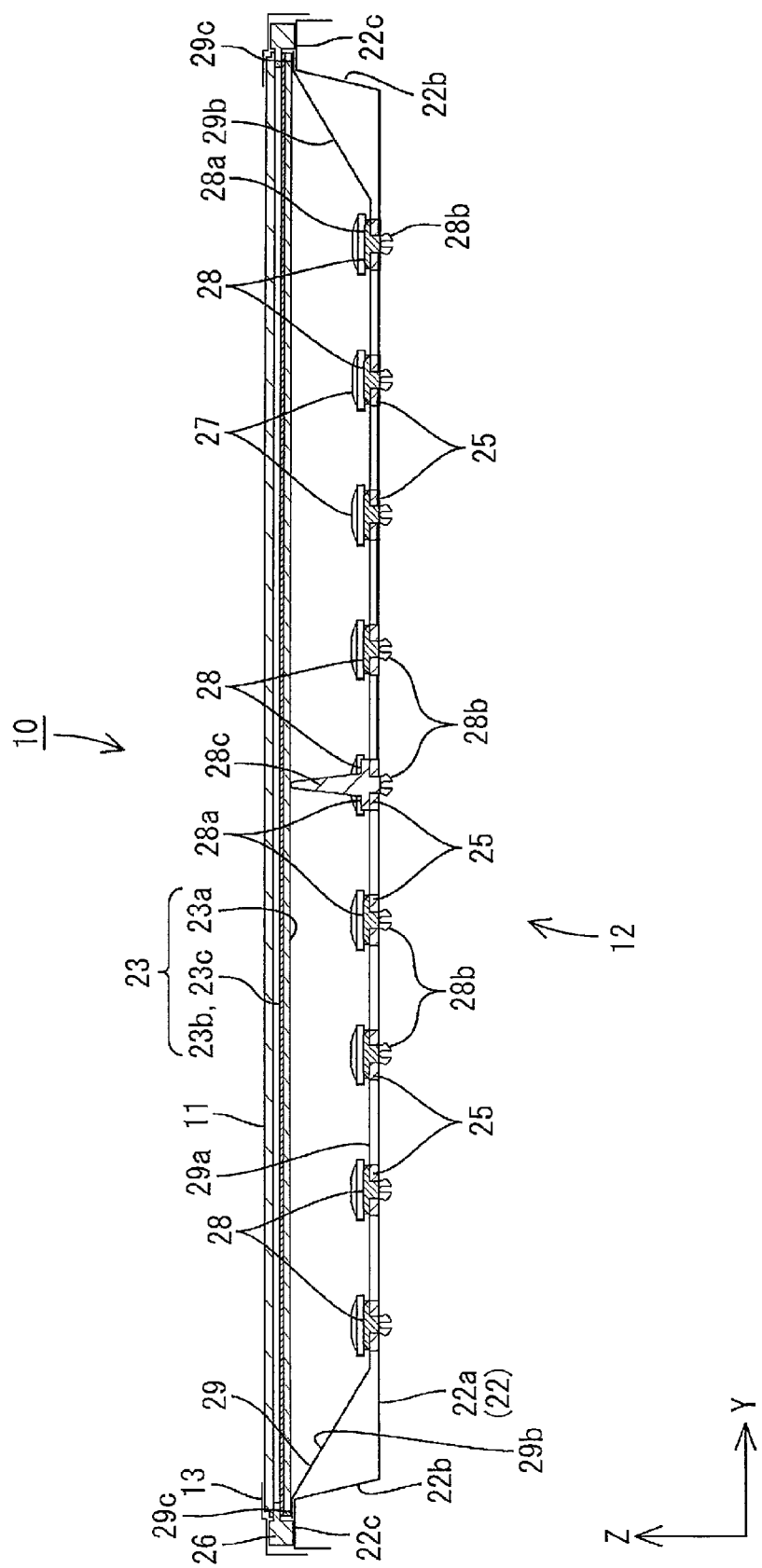
FIG. 8 is a cross sectional view of the liquid crystal display device taken along line viii-viii of FIG. 6.

The chassis 22 is made of metal and, as shown in FIGS. 6 to 8, includes a bottom plate 22a with a horizontally long square shape (rectangular shape) similar to the liquid crystal panel 11; side plates 22b rising from the outer ends of the bottom plate 22a along the sides thereof (a pair of long sides and a pair of short sides) toward the front side (light output side); and backing plates 22c extending outward from the rising ends of the side plates 22b. Thus, the chassis 22 as a whole has a shallow box-like shape (substantially shallow dish-like shape) with an opening on the front side. The chassis 22 has a long side direction aligned with the X-axis direction (the horizontal direction) and a short side direction aligned with the Y-axis direction (the vertical direction). The backing plates 22c of the chassis 22 are configured to receive the frame 26 and the optical members 23 from the front side, as will be described later. The frame 26 is threadably mounted on the backing plates 22c. The bottom plate 22a of the chassis 22 has attaching holes 22d into which the holding members 28 are attached. Specifically, a plurality of the attaching holes 22d is arranged in a distributed manner correspondingly to the positions at which the holding members 28 are attached on the bottom plate 22a.

The optical members 23, as shown in FIG. 2, have a horizontally long square shape in plan view similar to the liquid crystal panel 11 and the chassis 22. The optical members 23, as shown in FIGS. 7 and 8, are arranged between the liquid crystal panel 11 and the LEDs 24 (LED boards 25) with the outer edges thereof received on the backing plates 22c to cover the opening of the chassis 22. The optical members 23 include the diffuser plate 23a on the rear side (facing the LEDs 24; opposite to the light output side), and the optical sheets 23b, 23c on the front side (facing the liquid crystal panel 11; the light output side). The diffuser plate 23a includes a substantially transparent plate-like base substrate of a resin with a predetermined thickness, in which a number of diffusing particles are dispersed. The diffuser plate 23a has the function of diffusing transmitted light. The optical sheets 23b, 23c are two sheets layered, each with a thickness smaller than the one of the diffuser plate 23a. Specifically, the optical sheets 23b, 23c may include a diffuser sheet, a prism sheet, and a reflection type polarizing sheet. According to the present embodiment, the diffuser sheet 23b and the prism sheet (lens sheet) 23c are used. These optical sheets 23b, 23c are layered on the diffuser plate 23a in the order of the diffuser sheet 23b and the prism sheet 23c from the back side. The diffuser sheet 23b has a diffusing function of diffusing the transmitted light.

Figure 12:
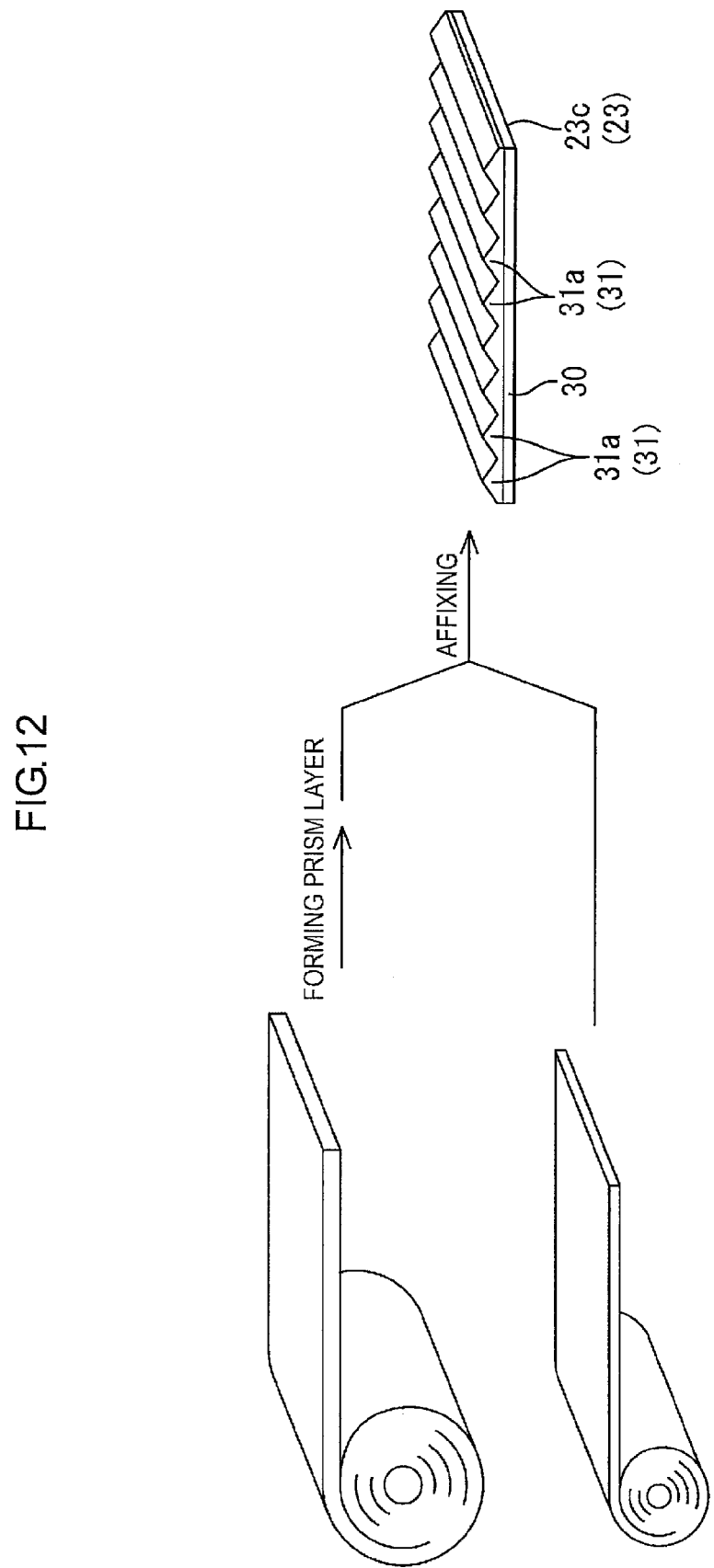
FIG. 12 is a schematic perspective view illustrating a step of forming a base member and a step of forming a prism layer included in a method of manufacturing the prism sheet.

A configuration of the prism sheet 23c will be described in detail. The prism sheet 23c, as shown in FIG. 12, includes a light transmissive base member 30 with excellent transmissivity, and a prism layer (optical functional layer) 31 layered on a main plate surface of the light transmissive base member 30. The prism sheet 23c diffuses light transmitting therethrough. The prism layer 31 is disposed on the front side (the light output side; facing the liquid crystal panel 11) of the light transmissive base member 30. Conversely, the light transmissive base member 30 is disposed on the rear side (opposite to the light output side; facing the LEDs 24) of the prism layer 31. The light transmissive base member 30 is substantially transparent and has a horizontally long sheet shape with a generally smooth surface. On the other hand, the prism layer 31 includes a number of prisms 31a with substantially triangular cross section, which are arranged in parallel with each other. The prisms 31a extend in parallel with one side of the light transmissive base member 30. The parallel arrangement direction of the prisms 31a is substantially orthogonal to the direction in which the prisms 31a extend. The light transmitted through the prism sheet 23c may be refracted or reflected, as appropriate, by the prisms 31a of the prism layer 31 such that the light travels toward the front surface as much as possible. The light transmissive base member 30 is made of a polyethylene resin, more specifically a PET (Poly-Ethylene-Terephthalate). The prism layer 31 is made of a non-halogenated acrylic resin. The prism sheet 23c may be preferably a "BEF3", which is a trade name, manufactured by Sumitomo 3M Limited. A detailed method of manufacturing the prism sheet 23c will be described later.

The frame 26, as shown in FIG. 2, has a frame-like shape extending along the outer peripheral edges of the liquid crystal panel 11 and the optical members 23. The frame 26 is configured to sandwich the outer edges of the optical members 23 (FIGS. 7 and 8) with the backing plates 22c. The frame 26 is also configured to receive the outer edges of the liquid crystal panel 11 on the rear side to sandwich the outer edges of the liquid crystal panel 11 with the bezel 13 on the front side (FIGS. 7 and 8).

Next, the LEDs 24 and the LED boards 25 will be described. The LEDs 24 are mounted on LED boards 25, and include the light emitting surface on the opposite side of the mounting surface on LED boards 25 as shown in FIGS. 6 to 8. That is, the LEDs 24 are of the top type. The LEDs 24 include a board portion which is fixedly attached on the LED boards 25. On the board portion, LED chips (LED elements; light emitting elements) of an InGaN based material, for example, are sealed on with a resin material. The LED chips mounted on the board portion have a single peak wavelength in the range of 435 nm to 480 nm, i.e., a blue wavelength region, and emit the single color light of blue. More preferably, the LED chips have a dominant emission wavelength in the range of 440 nm to 460 nm, such as 451 nm, for example. Thus, the LED chips emit the single color light of blue with excellent color purity.

The resin material with which the LED chips are sealed contains the green phosphor that emits green light upon excitation by the single color of blue light emitted by the LED chips, and the red phosphor that emits red light upon excitation by the single color of blue light emitted by the LED chips, the green phosphor and the red phosphor being dispersed at a predetermined ratio. On the basis of the blue light (light of blue component) emitted by the LED chips, the green light (light of green component) emitted from the green phosphor, and the red light (light of red component) emitted from the red phosphor, the LEDs 24 as a whole are configured to emit light of a predetermined color, such as white or bluish white. The dominant emission wavelength of the light emitted by the LEDs 24, i.e., the peak wavelength at which the emission intensity is at the maximum, corresponds to the peak wavelength of the LED chips and belongs to the blue wavelength region. By combining the light of green component from the green phosphor and the light of red component from the red phosphor, yellow light can be obtained. Thus, it can be said that the LEDs 24 have the light of yellow component in addition to the light of blue component from the LED chips.

The LED boards 25, as shown in FIGS. 6 and 7, include base members with a horizontally long square shape in plan view. The LED boards 25 are housed in the chassis 22 along the bottom plate 22a with a long side direction aligned with the X-axis direction and a short side direction aligned with the Y-axis direction. On the front side of the plate surfaces of the base members of the LED boards 25 (i.e., facing the optical members 23), the LEDs 24 are surface-mounted. The light emitting surfaces of the LEDs 24 face the optical members 23 (the liquid crystal panel 11) with an optical axis aligned with the Z-axis direction, which is orthogonal to the display surface of the liquid crystal panel 11. Specifically, a plurality of the LEDs 24 is arranged linearly side by side along the long side direction (X-axis direction) of the LED boards 25, and connected in series by a wiring pattern formed on the LED boards 25. The LEDs 24 have a substantially constant arrangement pitch; namely, the LEDs 24 are arranged at regular intervals. At the respective ends of the LED boards 25 in the long side direction, connector portion 25a is provided.

As shown in FIG. 6, a plurality of the LED boards 25 with the above configuration is arranged side by side in the X-axis direction and the Y-axis direction in the chassis 22, with their long side directions and short side directions aligned with each other. Namely, the LED boards 25 and the LEDs 24 mounted thereon are arranged in rows and columns (in a matrix or planar arrangement) in the chassis 22, the row direction corresponding to the X-axis direction (the long side direction of the chassis 22 and the LED boards 25) and the column direction corresponding to the Y-axis direction (the short side direction of the chassis 22 and the LED boards 25). Specifically, a total of 27 LED boards 25, i.e., three in the X-axis direction times nine in the Y-axis direction, are arranged side by side in the chassis 22. The LED boards 25 arranged along the X-axis direction to form a row are mutually electrically connected by the adjacent connector portions 25a fitted to each other. The connector portions 25a corresponding to the ends of the chassis 22 in the X-axis direction are electrically connected to an external control circuit, which is not shown. Thus, all of the LEDs 24 arranged on the LED boards 25 constituting a single row are connected in series to be turned on or off altogether by a single control circuit, thus achieving cost reduction. The LED boards 25 arranged along the Y-axis direction have substantially the same arrangement pitch. Thus, in the chassis 22, the LEDs 24 are arranged in a planar manner along the bottom plate 22a in the chassis 22 at substantially regular intervals with respect to the X-axis direction and the Y-axis direction.

The diffuser lenses 27 are made of a substantially transparent (highly light transmissive) synthetic resin material with a refractive index higher than that of air (such as polycarbonate or acrylic material). The diffuser lenses 27 have a predetermined thickness and a substantially circular shape in plan view, as shown in FIGS. 6 and 7. The diffuser lenses 27 are attached to the LED boards 25 to cover the LEDs 24 individually from the front side, that is, the diffuser lenses 27 overlap with the LEDs 24 in plan view. The diffuser lenses 27 are configured to output the light emitted by the LEDs 24, which has strong directionality, in a diffusing manner. Specifically, the light emitted by the LEDs 24 passes through the diffuser lenses 27 to reduce its directionality. Therefore, the regions between the adjacent LEDs 24 can be prevented from being visually recognized as being dark even when the intervals between the LEDs 24 are increased. Thus, the number of LEDs 24 installed can be decreased. The diffuser lenses 27 are substantially coaxial with the LEDs 24 in plan view.

Next, the holding members 28 will be described. The holding members 28 are made of a synthetic resin, such as polycarbonate resin, and have a white surface for excellent light reflectivity. The holding member 28, as shown in FIGS. 6 to 8, includes a main body portion 28a extending along the plate surface of the LED boards 25, and a fixing portion 28b protruding from the main body portion 28a toward the rear side, i.e., the chassis 22, to be fixed to the chassis 22. The main body portion 28a has a substantially circular plate-like shape in plan view and is configured to sandwich the LED boards 25 and the reflection sheet 29, which will be described in detail later, with the bottom plate 22a of the chassis 22. The fixing portion 28b penetrates through insertion holes 25b and the attaching holes 22d, which are respectively formed in the LED boards 25 and the bottom plate 22a of the chassis 22 at positions corresponding to the attaching positions of the holding members 28, to be locked on the bottom plate 22a. As shown in FIG. 6, a number of the holding members 28 are arranged side by side in rows and columns on the planes of the LED boards 25. Specifically, the holding members 28 are arranged between the adjacent diffuser lenses 27 (LEDs 24) with respect to the X-axis direction.

Of the holding members 28, a pair arranged at the center of the screen includes a support portion 28c protruding from the main body portion 28a toward the front side. The support portion 28c is configured to support the optical members 23 (or the diffuser plate 23a directly) from the rear side to maintain a constant positional relationship between the LEDs 24 and the optical members 23 in the Z-axis direction and thereby to prevent unexpected deformation of the optical members 23.

The reflection sheet 29 is made of a synthetic resin and has a white surface for excellent light reflectivity. The reflection sheet 29, as shown in FIGS. 6 to 8, is dimensioned to be laid over substantially the entire area of the inner surface of the chassis 22 to cover all the LED boards 25 disposed in rows and columns in the chassis 22 at once from the front side. The reflection sheet 29 is configured to reflect the light in the chassis 22 toward the optical members 23. The reflection sheet 29 includes: a bottom portion 29a extending along the bottom plate 22a of the chassis 22 and dimensioned to cover most of the bottom plate 29a; four rising portions 29b rising from the respective outer ends of the bottom portion 29a toward the front side and inclined with respect to the bottom portion 29a; and extension portions 29c extending outward from the outer ends of the rising portions 29b and placed on the backing plates 22c of the chassis 22. The bottom portion 29a of the reflection sheet 29 is disposed on the front side surface of the LED boards 25, i.e., in overlapping manner with respect to the mounting surface for the LEDs 24 on the front side. The bottom portion 29a of the reflection sheet 29 has lens insertion holes 29d for the diffuser lenses 27 at positions overlapping with the respective to the diffuser lenses 27 (LEDs 24) in plan view (as shown in FIGS. 6).

As described above, according to the present embodiment, the color filter 19 of the liquid crystal panel 11, as shown in FIGS. 3 and 5, includes the yellow color section Y in addition to the color sections R, G, and B of the three primary colors of light. Thus, the color gamut of the display image displayed by the transmitted light is expanded. Therefore, the image can be displayed with excellent color reproducibility. Further, the light transmitted through the yellow color section Y has wavelength close to the peak of luminosity factor, and therefore, tends to be perceived by the human eye as being bright even at small energy level. Thus, sufficient brightness can be obtained even when the output from the light sources, i.e., the LEDs 24 of the backlight unit 12 is restrained. Accordingly, the electric power consumption by the light sources can be decreased and thereby improved environmental friendliness can be obtained.

On the other hand, when the four-color liquid crystal panel 11 as above described is used, the display image of the liquid crystal panel 11 may tend to become yellowish as a whole. In order to avoid this, in the backlight unit 12 according to the present embodiment, the chromaticity in the LEDs 24 is adjusted toward blue as the complementary color to yellow such that the chromaticity in the displayed image can be corrected. Thus, as described above, the LEDs 24 of the backlight unit 12 have the dominant emission wavelength in the blue wavelength region. The light in the blue wavelength region has the highest emission intensity. If the optical members 23 assembled and used in the backlight unit 12 are continuously irradiated with the light in the blue wavelength region, i.e., of high emission intensity, the optical characteristics of the optical members 23 may be changed, and the chromaticity of the color of white of the transmitted light may be shifted toward blue. When the chromaticity of the color of white of the transmitted light of the optical members 23 is changed as above described in association with use of the backlight unit 12 and the liquid crystal display device 10, the tinge of the displayed image on the liquid crystal panel 11 may be gradually changed toward blue with the elapse of the time of use, possibly resulting in a significant decrease in display quality. According to the present embodiment, a comparative experiment was conducted with respect to the prism sheet 23c among the optical members 23 as described below.

Figure 9:
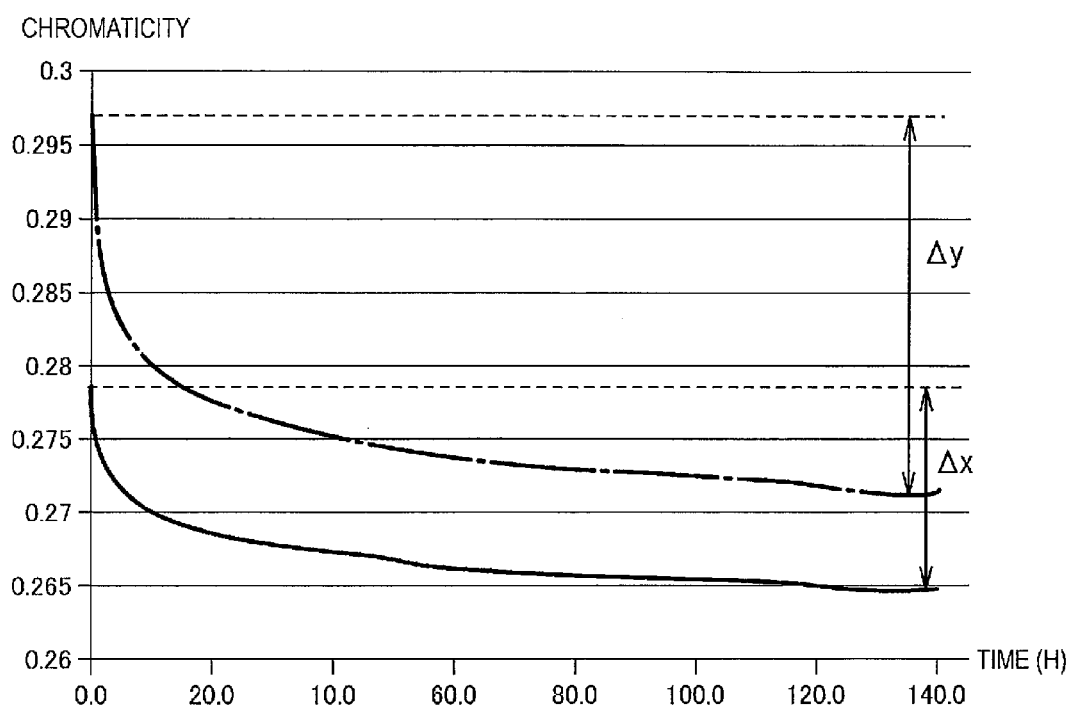
FIG. 9 is a graph showing the relationship between the duration of time that a prism sheet has been irradiated with the light from LEDs of the backlight unit and the chromaticity of the color of white of the transmitted light through the prism sheet.
Figure 10:
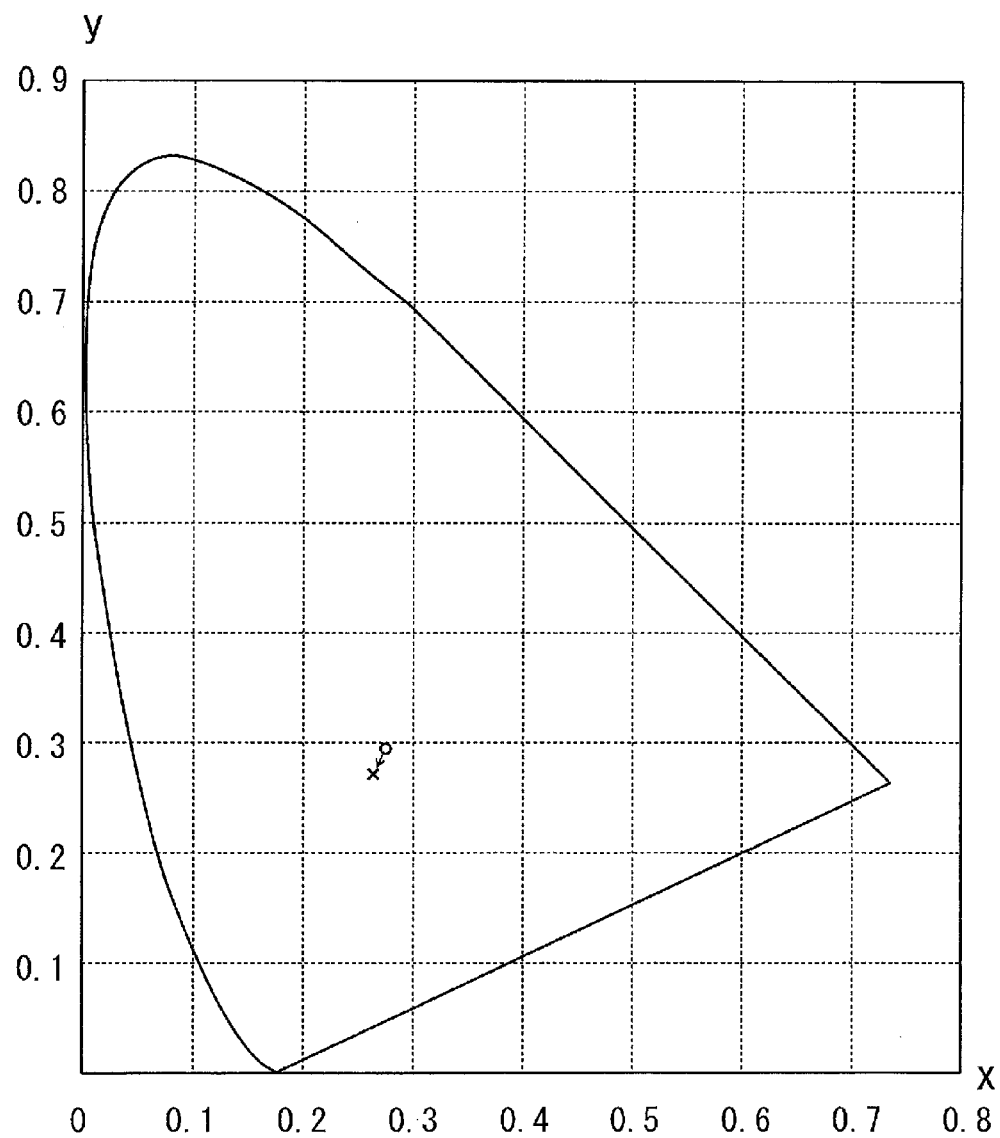
FIG. 10 is a CIE1931 chromaticity diagram showing the chromaticity coordinates of the color of white of the transmitted light through the prism sheet before irradiation on the prism sheet with the light from the LEDs of the backlight unit and after irradiation for 100 hours.
Figure 11:
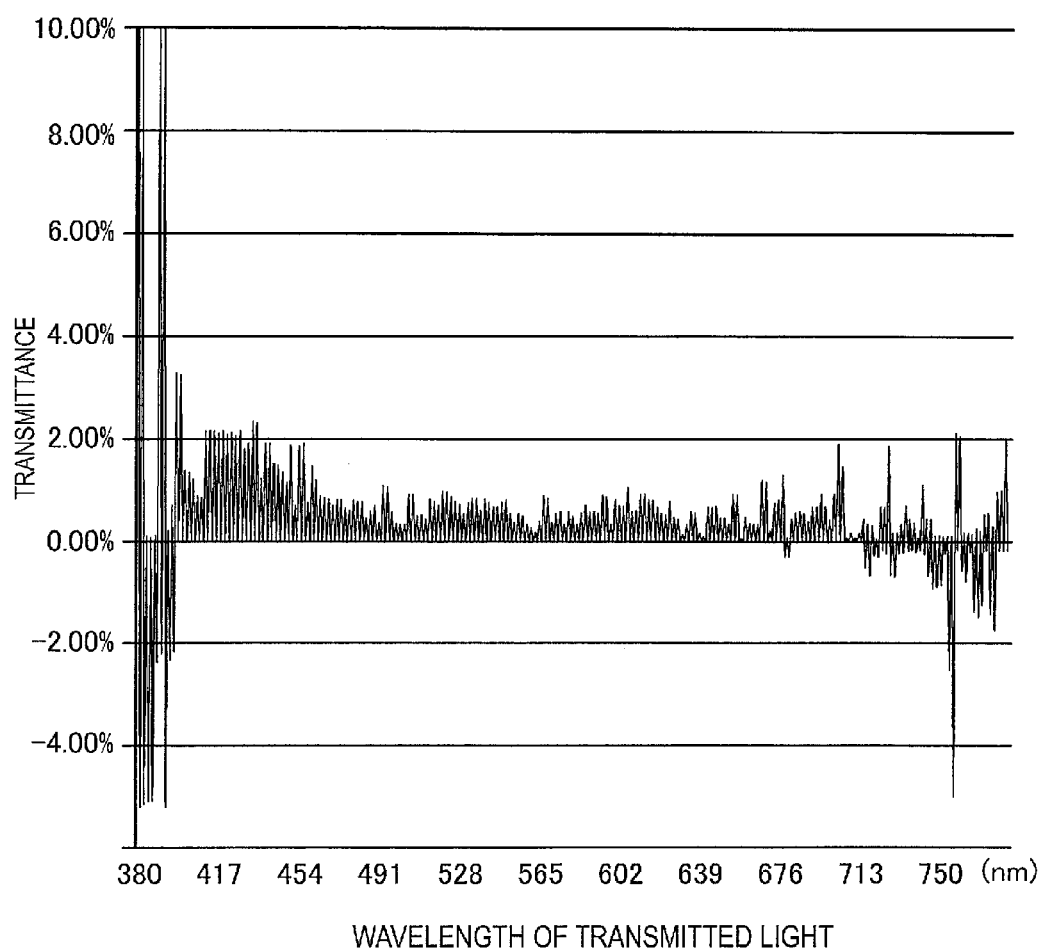
FIG. 11 is a graph showing the relationship between the wavelength of the transmitted light through the prism sheet and the transmittance of the transmitted light.

In the comparative experiment, the prism sheet 23c was irradiated with the light from the LEDs 24 used in the backlight unit 12 for 140 hours, and how the chromaticity of the color of white of the transmitted light through the prism sheet 23c would change was measured at 20 hour intervals. The results are shown in FIG. 9. Further, how the chromaticity of the color of white of the transmitted light through the prism sheet 23c would change, and how the transmittance of the transmitted light at various wavelengths would change were measured before and after the 100 hours irradiation of the prism sheet 23c with the light from the LEDs 24. The results are shown in FIGS. 10 and 11. In FIG. 9, the horizontal axis shows the duration of time of irradiation of the prism sheet 23c with the light from the LEDs 24 (in units "H"), while the vertical axis shows the chromaticity of the color of white of the transmitted light using x and y values. Specifically, in FIG. 9, the solid line indicates the x value of the chromaticity, and the dashed line indicates the y value of the chromaticity. The x and y values are the values of the chromaticity coordinates in the CIE (Commission Internationale de l'Eclairage) 1931 chromaticity diagrams shown in FIG. 10. FIG. 10 is the CIE1931 chromaticity diagram showing the x value on the horizontal axis and the y value on the vertical axis, where the white circle "○" indicates the chromaticity coordinates before irradiation of the prism sheet 23c with the light from the LEDs 24, while the cross mark "X" indicates the chromaticity coordinates after the 100 hours irradiation. The direction of change in the chromaticity coordinates as a result of irradiation is indicated by the arrow. In FIG. 11, the horizontal axis shows the wavelength of the transmitted light through the prism sheet 23c (in units "nm"), and the vertical axis shows the transmittance of the transmitted light of the prism sheet 23c (in units "%"). Specifically, FIG. 11 shows the difference in transmittance at each wavelength which was obtained by subtracting the transmittance of the transmitted light through the prism sheet 23c prior to irradiation from the transmittance of the transmitted light through the prism sheet 23c after 100 hours irradiation. Thus, in FIG. 11, a positive (+) transmittance means that the transmittance is increased by the 100 hours irradiation, while a negative transmittance (−) means that the transmittance is decreased by the irradiation.

The results of the comparative experiment will be described. It is seen from the graph of FIG. 9 that, when the prism sheet 23c is irradiated with the light from the LEDs 24, the x and the y values indicating the chromaticity of the color of white of the transmitted light are gradually decreased with the elapse of the time of irradiation. In the CIE1931 chromaticity diagram shown in FIG. 10, both the x and y values of the chromaticity of the color of white are decreased, and as a result, shifted in the direction indicated by the arrow, which means that the chromaticity of the color of white is shifted toward blue. It is also seen from the graph of FIG. 9 that after 100 hours irradiation with the light from the LEDs 24, the change in the chromaticity of the transmitted light through the prism sheet 23c is very small, converging into a generally constant value. In other words, as the prism sheet 23c is irradiated with the light from the LEDs 24, the chromaticity of the color of white of the transmitted light continues changing toward blue over time; after about 100 hours, however, the chromaticity is hardly changed and becomes stable. Specifically, when the difference between the chromaticity before irradiation with the light from the LEDs 24 and the chromaticity that is stabilized after 100 hours or more of the irradiation is expressed by $\Delta x$ and $\Delta y$ respectively, $\Delta x$ is 0.0143 and $\Delta y$ is 0.0258.

Further, it is seen from the graph of FIG. 11 that, except for a violet wavelength region (380 nm to 435 nm) and a longer wavelength part of a red wavelength region (750 nm to 780 nm), in a shorter wavelength part of the red wavelength region (600 nm to 750 nm), a yellow wavelength region (580 nm to 600 nm), a green wavelength region (500 nm to 560 nm), and the blue wavelength region (435 nm to 480 nm), the optical characteristics of the prism sheet 23c are changed such that the transmittance is generally increased by irradiating the prism sheet 23c with the light from the LEDs 24. More specifically, in the blue wavelength region, the transmittance is particularly increased compared with the transmittance of the other colors (such as red, green, and yellow). This means that the amount of increase in the transmitted light in the blue wavelength region is greater than the amount of increase in the transmitted light in the wavelength region of other colors; namely, the absorptance with respect to the light of the blue wavelength region is lower than the absorptance with respect to the light of the wavelength region of other colors. If the amount of transmitted light in the blue wavelength region is larger than the amount of transmitted light in the wavelength region of other colors, the chromaticity of the color of white of the transmitted light is shifted toward blue, which supports the result shown in FIG. 10. The chromaticity shift of the transmitted light is an irreversible change.

The reasons for the shift in the chromaticity of the color of white of the transmitted light through the prism sheet 23c toward blue may include the use environment involving the long-term irradiation with the light from the LEDs 24 that has high emission intensity in the blue wavelength region, and the material of the prism sheet 23c, for example. Specifically, it may be surmised that, because the light in the blue wavelength region has particularly high optical energy among the visible rays of light, the light acts on the chromophore (more specifically, the carbonyl group in PET) included in the light transmissive base member 30 of the prism sheet 23c to change the amount of absorption (or the amount of transmission) of light of the various wavelengths. In addition, the prism sheet 23c collect light transmitting therethrough. Therefore, the change in the chromaticity of the transmitted light through the prism sheet 23c is relatively conspicuous compared with the other optical members 23a, 23b. Thus, it is important to solve the problem of chromaticity shift in the prism sheet 23c for an appropriate displayed image.

Thus, according to the present embodiment, the manufacturing step of the prism sheet 23c includes a step of stabilizing the chromaticity of the transmitted light toward blue in advance. In the following, a method of manufacturing the prism sheet 23c will be described in detail. The prism sheet 23c, as shown in FIG. 12, is manufactured through a step of forming the light transmissive base member 30; a step (functional layer forming step) of layering the prism layer 31, which is an optical functional layer, on the light transmissive base member 30; and the chromaticity stabilizing step of the transmitted light. In the base member forming step, PET as raw material for the light transmissive base member 30 is heated and kneaded, and then extruded by an extruder, which is not shown. The extruded PET is formed into a uniform thickness by being sandwiched between rollers. In the prism layer forming step, a non-halogenated acrylic resin as raw material for the prism layer 31 is extruded and formed into a flat plate shape in the same manner as in the base member forming step, and then pressed by a die (not shown) of the prism shape with respect to the one side surface to form the prisms 31a. Thereafter, the prism layer 31 is affixed to the light transmissive base member 30 on the opposite side surface of the prisms 31a by using an affixing apparatus, which is not shown.

Figure 13:
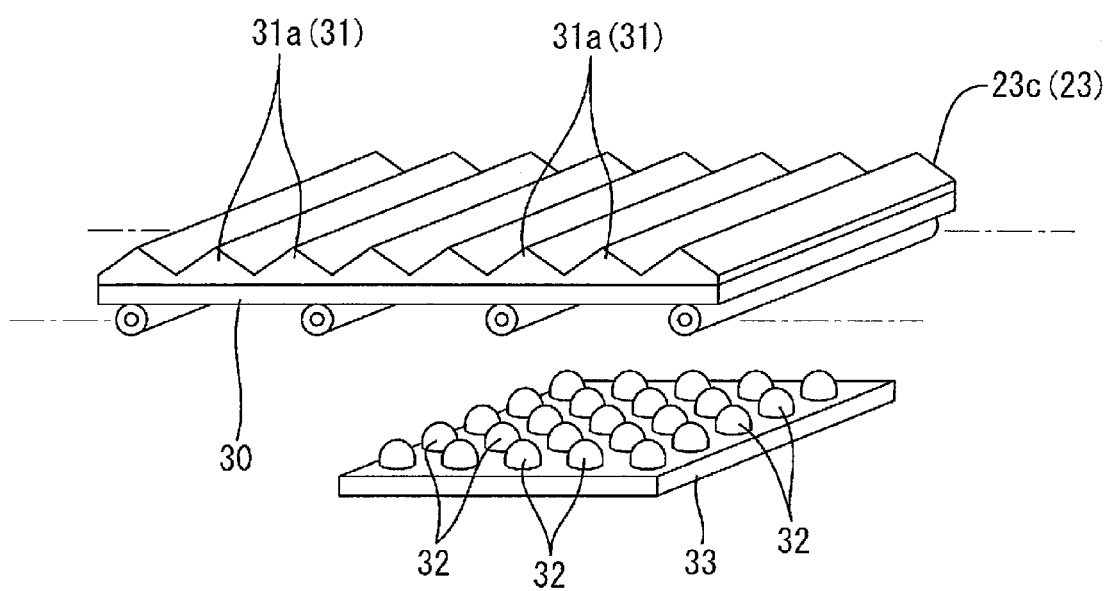
FIG. 13 is a schematic perspective view illustrating a step of stabilizing chromaticity included in the method of manufacturing the prism sheet.

Then, in the chromaticity stabilizing step, as shown in FIG. 13, the prism sheet 23c formed through the base member forming step and the prism layer forming step is irradiated with light from chromaticity stabilizing LEDs 32, on one of the main plate surfaces, i.e., the front and rear sides, of the prism sheet 23c. The chromaticity stabilizing LEDs 32 will be described in detail. The chromaticity stabilizing LEDs 32 are disposed downstream in the affixing apparatus used in the prism layer forming step, in the prism sheet manufacturing line. The chromaticity stabilizing LEDs 32 are disposed to face the light transmissive base member 30 of the prism sheet 23c transported out of the affixing apparatus. Thus, the light from the chromaticity stabilizing LEDs 32 passes through the light transmissive base member 30 before the prism layer 31.

On a board 33, a number of the chromaticity stabilizing LEDs 32 are surface-mounted in a matrix. Specifically, the chromaticity stabilizing LEDs 32 include LED chips (LED elements; light emitting elements) of an InGaN-based material, for example, are sealed with a resin material. The LED chips of the chromaticity stabilizing LEDs 32 have a single peak wavelength in a range of 435 nm to 480 nm, i.e., the blue wavelength region, and emit the single color light of blue. More preferably, the LED chips of the chromaticity stabilizing LEDs 32 have a dominant emission wavelength in a range of 440 nm to 460 nm, specifically at 451 nm, for example, which is the same as the dominant emission wavelength of the LED chips of the LEDs 24 of the backlight unit 12. However, the chromaticity stabilizing LEDs 32 do not contain a phosphor as in the LEDs 24 of the backlight unit 12. Thus, the chromaticity stabilizing LEDs 32 have the same dominant emission wavelength of the LEDs 24 of the backlight unit 12 and emit the single color light of blue with excellent color purity. The emission intensity of the light in the blue wavelength region from the chromaticity stabilizing LEDs 32 is relatively higher than the corresponding emission intensity from the LEDs 24 of the backlight unit 12.

In the chromaticity stabilizing step, the prism sheet 23c formed through the base member forming step and the prism layer forming step is irradiated with the light from the chromaticity stabilizing LEDs 32 for a predetermined time such that the chromaticity of the color of white of the transmitted light can be stabilized. In other words, prior to being assembled and used in the backlight unit 12, the prism sheet 23c is stabilized by previously shifting the chromaticity of the color of white of the transmitted light toward blue such that hardly any more shifting of the chromaticity is caused. Thus, when the manufactured prism sheet 23c that is subjected to the stabilizing process is assembled and used in the backlight unit 12, the optical characteristics of the prism sheet 23c are hardly changed even when the prism sheet 23c is continuously irradiated with the light from the LEDs 24 of the backlight unit 12. Therefore, the tinge of the displayed image on the liquid crystal panel 11 is hardly changed over time. Accordingly, high display quality can be obtained in the liquid crystal display device 10. In addition, the chromaticity stabilizing LEDs 32 used in the chromaticity stabilizing step emit the single color light of blue, and have the dominant emission wavelength in the blue wavelength region. The emission intensity of the light in the blue wavelength region from the chromaticity stabilizing LEDs 32 is higher than the emission intensity of the LEDs 24 of the backlight unit 12. Thus, the chromaticity of the color of white of the transmitted light through the prism sheet 23c can be stabilized in less irradiation time than when the LEDs 24 are used (100 hours). In this way, time required for the chromaticity stabilizing step can be decreased, leading to high manufacturing efficiency. Further, in the prism sheet 23c manufactured through the chromaticity stabilizing step, as shown in FIG. 11, the transmittance of the visible rays of light is generally increased at the various wavelengths (belonging to the shorter wavelength part of the red wavelength region or the yellow, green, or blue wavelength region), resulting in an increased brightness of the displayed image. This means that sufficient brightness in the displayed image can be obtained even when the output of the LEDs 24 of the backlight unit 12 is decreased, thereby providing the effect of reduced power consumption.

As described above, the method of manufacturing the prism sheet 23c according to the present embodiment, which is used in the backlight unit 12 supplying light to the liquid crystal panel 11 to transmit the light from the LEDs 24 as light sources of the backlight unit 12, includes the chromaticity stabilizing step of the transmitted light by irradiation with the light having the dominant emission wavelength in the blue wavelength region from the chromaticity stabilizing LEDs 32 as chromaticity stabilizing light sources.

When the prism sheet 23c manufactured without the chromaticity stabilizing step is assembled and used in the backlight unit 12 irradiating the liquid crystal panel 11 with light, the optical characteristics of the prism sheet 23c would be changed and the chromaticity of the color of white of the transmitted light would be gradually shifted toward blue in association with irradiation of the prism sheet 23c with the light in the blue wavelength region from the LEDs 24 of the backlight unit 12. As a result, the tinge of the displayed image would be changed over time, possibly decreasing the display quality.

In contrast, according to the present embodiment, the prism sheet 23c is irradiated with the light having the dominant emission wavelength in the blue wavelength region from the chromaticity stabilizing LEDs 32 to change the optical characteristics of the prism sheet 23c in the chromaticity stabilizing step during the manufacture of the prism sheet 23c, such that the chromaticity of the transmitted light of the prism sheet 23c can be shifted toward blue. Namely, a change in the optical characteristics of the prism sheet 23c to be used in the backlight unit 12 is promoted in advance during the manufacturing process such that the chromaticity of the color of white of the transmitted light is shifted toward blue, whereby the chromaticity of the transmitted light can be stabilized. Thus, when the prism sheet 23c is assembled and used in the backlight unit 12, a change in the chromaticity is less likely to occur. Accordingly, when the prism sheet 23c is used in the backlight unit 12, the tinge of the displayed image on the liquid crystal panel 11 is not changed over time, and therefore excellent display quality can be obtained. Because the light from the chromaticity stabilizing LEDs 32 has the dominant emission wavelength in the blue wavelength region, the change in the optical characteristics of the prism sheet 23c can be efficiently promoted, and time required for the chromaticity stabilizing step can be decreased, whereby high manufacturing efficiency can be obtained. Thus, according to the present embodiment, the change in the chromaticity due to use can be made difficult to occur.

In the chromaticity stabilizing step, the emission intensity of the light in the blue wavelength region from the chromaticity stabilizing LEDs 32 is relatively higher than the corresponding emission intensity of the LEDs 24 of the backlight unit 12. Accordingly, the optical irradiation time in the chromaticity stabilizing step necessary for stabilizing the chromaticity of the transmitted light from the prism sheet 23c can be decreased more as the emission intensity of the light in the blue wavelength region is increased. Thus, time required for the chromaticity stabilizing step can be decreased compared with the case where the same LEDs as the LEDs 24 of the backlight unit 12 are used as the chromaticity stabilizing LEDs 32.

In the chromaticity stabilizing step, the dominant emission wavelength of the chromaticity stabilizing LEDs 32 is the same as the dominant emission wavelength of the LEDs 24 of the backlight unit 12. In this way, the optical characteristics of the prism sheet 23c can be more appropriately changed in the chromaticity stabilizing step. Thus, when the manufactured prism sheet 23c is assembled and used in the backlight unit 12, a more appropriate tinge of color of the displayed image on the liquid crystal panel 11 can be obtained, leading to an extremely high display quality.

In the chromaticity stabilizing step, the chromaticity stabilizing LEDs 32 emit the substantially single color light of blue. In this way, the prism sheet 23c can be irradiated with the light in the blue wavelength region extremely efficiently in the chromaticity stabilizing step. Thus, in the chromaticity stabilizing step, the irradiation time necessary for stabilizing the chromaticity of the transmitted light in the prism sheet 23c can be decreased. Accordingly, time required for the chromaticity stabilizing step can be further decreased.

In the chromaticity stabilizing step, the chromaticity stabilizing LEDs 32 having the LED elements emitting the substantially single color light of blue are included as the chromaticity stabilizing light sources. In this way, in the chromaticity stabilizing step, the prism sheet 23c is irradiated with the substantially single color light of blue having extremely high color purity from the LED elements of the chromaticity stabilizing LEDs 32. Thus, time required for the chromaticity stabilizing step can be further decreased.

In the base member forming step, the light transmissive base member 30 of the prism sheet 23c is formed. In the chromaticity stabilizing step, at least the light transmissive base member 30 is irradiated with the light from the chromaticity stabilizing LEDs 32. This is particularly suitable in the case where the change in the optical characteristics of the prism sheet 23c is due to the light transmissive base member 30.

In the base member forming step, the light transmissive base member 30 is formed from a polyester resin. In this way, the chromaticity of the transmitted light in the light transmissive base member 30 of a polyester resin can be stabilized through the chromaticity stabilizing step.

In the base member forming step, the light transmissive base member 30 is formed from PET (polyethylene terephthalate). In this way, although PET includes a carbonyl group as the chromophore and the carbonyl group may be a factor causing a change in the optical characteristics, the chromaticity of the transmitted light from the light transmissive base member 30 of PET can be stabilized through the chromaticity stabilizing step.

In the prism layer forming step (functional layer forming step), the prism layer 31, which is an optical functional layer providing the transmitted light with an optical effect, is layered on the light transmissive base member 30. In this way, the prism sheet 23c including the prism layer 31 layered on the light transmissive base member 30 can be manufactured in a preferred manner.

The chromaticity stabilizing step follows the base member forming step and the prism layer forming step. If the base member forming step and the prism layer forming step are performed successively, performing the chromaticity stabilizing step prior to the prism layer forming step would require a significant modification of the manufacturing apparatus. In this respect, according to the present embodiment, the chromaticity stabilizing step can be included in the method of manufacturing the prism sheet 23c without any significant modification of the manufacturing apparatus.

In the chromaticity stabilizing step, the chromaticity stabilizing LEDs 32 are disposed in an opposed manner with respect to at least the light transmissive base member 30. In this way, the light transmissive base member 30 can be efficiently irradiated with the light from the chromaticity stabilizing LEDs 32 in the chromaticity stabilizing step. Thus, the chromaticity of the transmitted light through the light transmissive base member 30 can be stabilized in less time.

In the chromaticity stabilizing step, the chromaticity stabilizing LEDs 32 may be disposed in an opposed manner with respect to the light transmissive base member 30 among the light transmissive base member 30 and the prism layer 31. In this way, because the chromaticity stabilizing LEDs 32 are disposed in an opposed manner with respect to only one side of the prism sheet 23c, the cost associated with a manufacturing apparatus for the prism sheet 23c can be decreased compared with the case where the chromaticity stabilizing LEDs 32 are disposed in an opposed manner with respect to both sides of the prism sheet 23c.

The optical functional layer is the prism layer 31 that collects light transmitting therethrough. In this way, in the prism sheet 23c including the prism layer 31, because the transmitted light is collected by the prism sheet 23c, the chromaticity shift of the color of white of the transmitted light toward blue tends to become more conspicuous. In this respect, according to the present embodiment, the chromaticity of the transmitted light from the prism sheet 23c is stabilized in advance in the chromaticity stabilizing step, which is extremely useful in the manufacture of the prism sheet 23c including the prism layer 31.

The prism layer 31 is made of a non-halogenated acrylic resin. In this way, the prism sheet 23c including the prism layer 31 of a non-halogenated acrylic resin can be manufactured in an extremely useful manner.

In the chromaticity stabilizing step, the prism sheet 23c to be used in the backlight unit 12 is irradiated with the light from the chromaticity stabilizing LEDs 32. In the backlight unit 12, the light sources are the LEDs 24 including the LED elements emitting the substantially single color light of blue and the phosphor emitting light upon excitation by the light from the LED elements. If the prism sheet 23c is used in the backlight unit 12 including the LEDs 24 as the light sources, the problem of the chromaticity shift of the transmitted light as a result of the change in the optical characteristics of the prism sheet 23c may become pronounced due to the substantially single color light of blue with extremely high color purity from the LED elements. Thus, by stabilizing the chromaticity of the transmitted light with respect to the prism sheet 23c used in the backlight unit in the chromaticity stabilizing step, the problem of chromaticity shift can be eliminated in a preferred manner.

In the chromaticity stabilizing step, the prism sheet 23c to be used in the backlight unit 12 is irradiated with the light from the chromaticity stabilizing LEDs 32. The backlight unit 12 supplies light to the liquid crystal panel 11, in which a substance with optical characteristics variable by application of an electric field is provided between the pair substrates 11a, 11b, and the color filter 19 including a plurality of color sections R, G, B, or Y exhibiting blue, green, red, and yellow, respectively, is formed on one of the pair of substrates 11a, 11b. Because the color filter 19 included in the liquid crystal panel 11 includes the yellow color section Y in addition to the blue, green, and red color sections R, G, and B, the displayed image on the liquid crystal panel 11 tends to have a yellowish tinge. In order to avoid this, the chromaticity of the output light of the LEDs 24 of the backlight unit 12 may preferably be set toward blue, which is the complementary color to yellow. However, in this case, the problem of the chromaticity shift of the transmitted light through the prism sheet 23c may become pronounced when the backlight unit 12 is used. This problem of the chromaticity shift can be eliminated in a preferred manner by stabilizing the chromaticity of the transmitted light through the prism sheet 23c used in the backlight unit 12 supplying light to the liquid crystal panel 11 in the chromaticity stabilizing step.

<Second Embodiment>

A second embodiment of the present invention will be described with reference to FIGS. 14 and 15. In the second embodiment, the diffuser sheet 23b of the optical members 23 is manufactured through a step of stabilizing chromaticity. Redundant description of structures, operations, and effects similar to those of the first embodiment will be omitted.

Of the optical members 23, the diffuser sheet 23b as well as the prism sheet 23c may also be subjected to the chromaticity shift of the color of white of the transmitted light toward blue when the diffuser sheet 23b is assembled and used in the backlight unit 12. In this case, it is preferable to include a step of stabilizing chromaticity also in steps of manufacturing the diffuser sheet 23b. In the following, a structure of the diffuser sheet 23b and a method of manufacturing the same will be described in detail.

Figure 14:
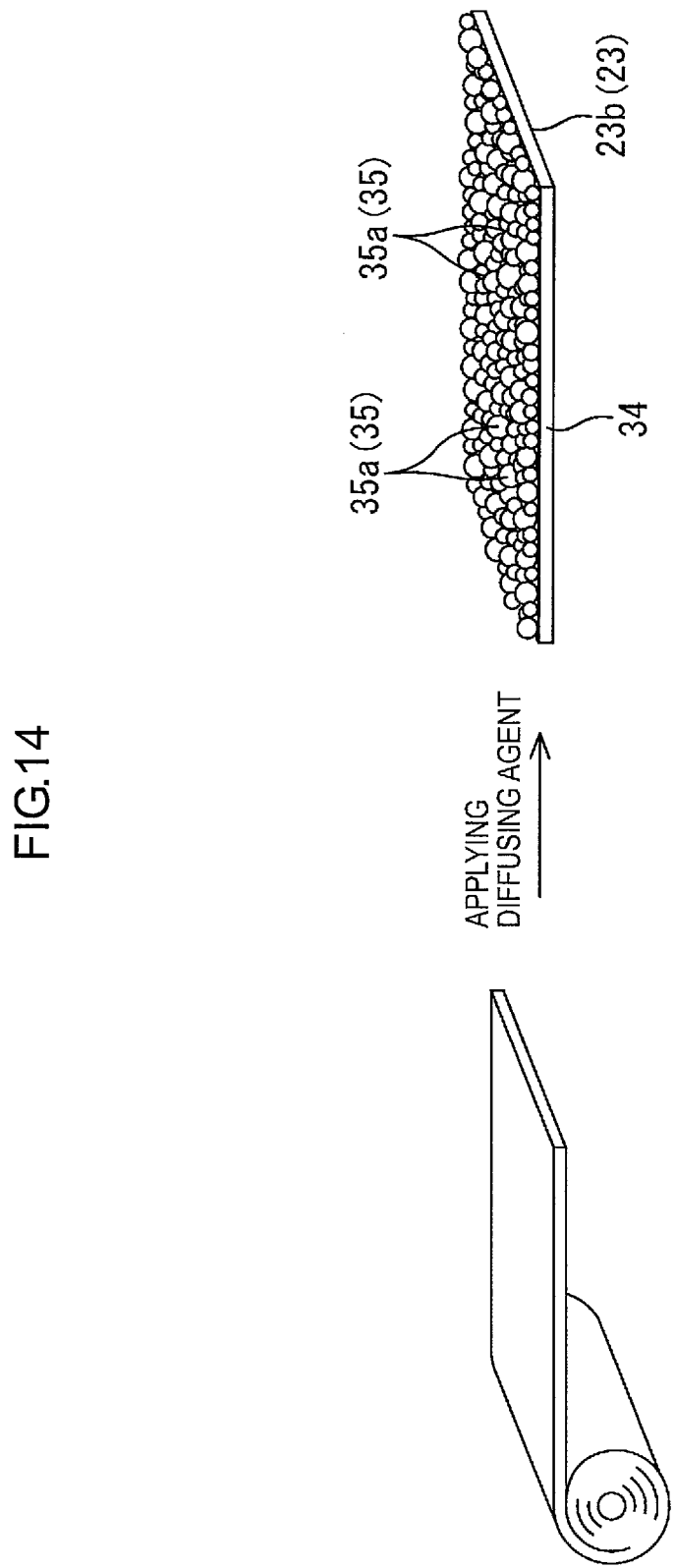
FIG. 14 is a schematic perspective view illustrating a step of forming a base member and a step of forming a diffuser layer included in a method of manufacturing a diffuser sheet according to a second embodiment of the present invention.
Figure 15:
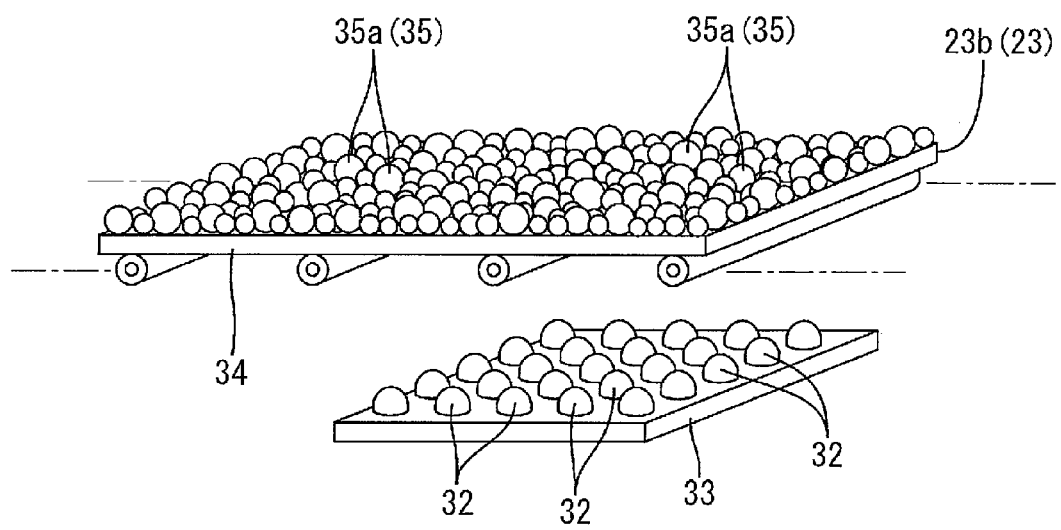
FIG. 15 is a schematic perspective view illustrating a step of stabilizing chromaticity included in the method of manufacturing the diffuser sheet.

The diffuser sheet 23b, as shown in FIG. 14, includes a light transmissive base member 34 having excellent transmissivity, and a diffuser layer (optical functional layer) 35 layered on a main plate surface of the light transmissive base member 34. The diffuser sheet 23b is configured to provide the transmitted light with a diffusing effect. The diffuser layer 35 is disposed on the front side (light output side) with respect to the light transmissive base member 34. The light transmissive base member 34 is disposed on the rear side (opposite to the light output side) with respect to the diffuser layer 35. The light transmissive base member 34 is substantially transparent and has a horizontally long sheet shape, with a generally smooth surface. On the other hand, the diffuser layer 35 contains a number of spherical diffusing beads 35a disposed on the surface of the light transmissive base member in a dispersed manner. The light passing through the diffuser sheet 23b is irregularly reflected by the diffusing beads 35a of the diffuser layer 35 to lose directionality and be diffused. The light transmissive base member 34 may be made of an AS resin (acrylonitrile-styrene copolymer). The diffuser layer 35 may be made of an alkyl methacrylate styrene non-copolymer.

The diffuser sheet 23b of the above configuration may be manufactured through a step of forming the light transmissive base member 34; a step (functional layer forming step) of layering the diffuser layer 35, which is an optical functional layer, on the light transmissive base member 34; and a step of stabilizing the chromaticity of the transmitted light. The base member forming step may be the same step for the prism sheet 23c according to the first embodiment. In the diffuser layer forming step, the diffuser layer 35 is formed by applying a diffusing agent containing a number of diffusing beads 35a dispersed in a predetermined solution onto the surface of the light transmissive base member 34 to have a generally uniform thickness. In the chromaticity stabilizing step, as shown in FIG. 15, the diffuser sheet 23b formed through the base member forming step and the diffuser layer forming step is irradiated with the light from the chromaticity stabilizing LEDs 32 on the side of the light transmissive base member 34. The chromaticity stabilizing LEDs 32 may be similar to those shown according to the first embodiment; thus, redundant description will be omitted.

The diffuser sheet 23b manufactured by the above manufacturing method is stabilized prior to being assembled and used in the backlight unit 12 such that the chromaticity of the color of white of the transmitted light is shifted toward blue in advance and made to be hardly changed any further. Thus, even when the manufactured diffuser sheet 23b is assembled and used in the backlight unit 12 and irradiated with the light from the LEDs 24 of the backlight unit 12 continuously, the optical characteristics of the diffuser sheet 23b are hardly changed. Thus, the tinge of the displayed image on the liquid crystal panel 11 is hardly changed over time. Accordingly, high display quality of the liquid crystal display device 10 can be obtained.

As described above, according to the present embodiment, the optical functional layer formed on the light transmissive base member 34 in the functional layer forming step is the diffuser layer 35 providing the transmitted light with a diffusing effect. In this way, the diffuser sheet 23b including the diffuser layer 35 providing the transmitted light with a diffusing effect can be manufactured in a preferred manner.

In the base member forming step, the light transmissive base member 34 is formed from an AS resin (acrylonitrile-styrene copolymer). In this way, the chromaticity of the transmitted light through the light transmissive base member 34 of the AS resin can be stabilized through the chromaticity stabilizing step.

The diffuser layer 35 is made of an alkyl methacrylate styrene non-copolymer. In this way, the diffuser sheet 23b including the diffuser layer 35 of the alkyl methacrylate styrene non-copolymer can be manufactured in a preferred manner.

<Third Embodiment>

A third embodiment of the present invention will be described with reference to FIGS. 16 to 19. In the third embodiment, an edge light backlight unit 212 including a diffusing member 223 will be described. Redundant description of structures, operations, and effects similar to those of the first embodiment will be omitted.

Figure 16:
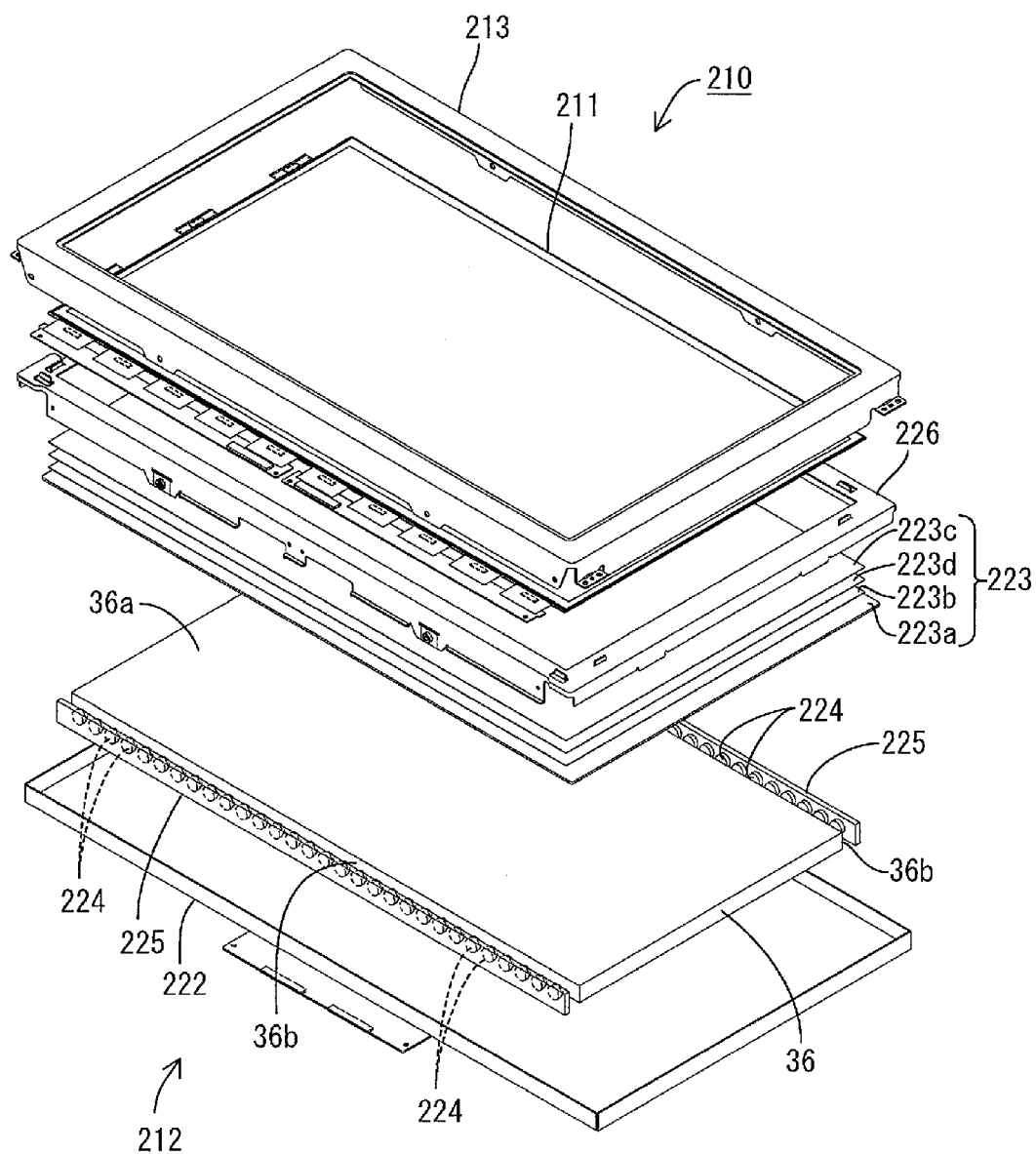
FIG. 16 is an exploded perspective view of a liquid crystal display device including an edge light backlight unit according to a third embodiment of the present invention.

A liquid crystal display device 210 according to the present embodiment, as shown in FIG. 16, includes a liquid crystal panel 211 and the edge light backlight unit 212 in an integrated manner using a bezel 213 or the like. The configuration of the liquid crystal panel 211 may be similar to the first embodiment and redundant description will be omitted. In the following, the configuration of the edge light backlight unit 212 will be described.

The backlight unit 212, as shown in FIG. 16, includes a substantially box-shaped chassis 222 with an opening on the light output surface side (the side facing the liquid crystal panel 211); and a plurality of optical members 223 covering the opening of the chassis 222. The chassis 222 houses LEDs (Light Emitting Diodes) 224 as light sources; LED boards 225 on which the LEDs 224 are mounted; a light guide member 36 that guides the light from the LEDs 224 toward the optical members 223 (the liquid crystal panel 211); and a frame 226 retaining the light guide member 36 from the front side. Each one of the LED boards 225 with the LEDs 224 is arranged at both ends of the backlight unit 212 on the long sides thereof with the light guide member 36 sandwiched between the LED boards 225 at the center. Thus, the backlight unit 212 is of the so-called edge light type (side light type). The backlight unit 212 according to the present embodiment, which is of the edge light type, does not include the diffuser lenses 27, the holding members 28, the first reflection sheet 30, the second reflection sheets 31, or the like included in the direct backlight unit 12 according to the first embodiment. In the following, the constituent components of the backlight unit 212 will be described in detail.

Figure 17:
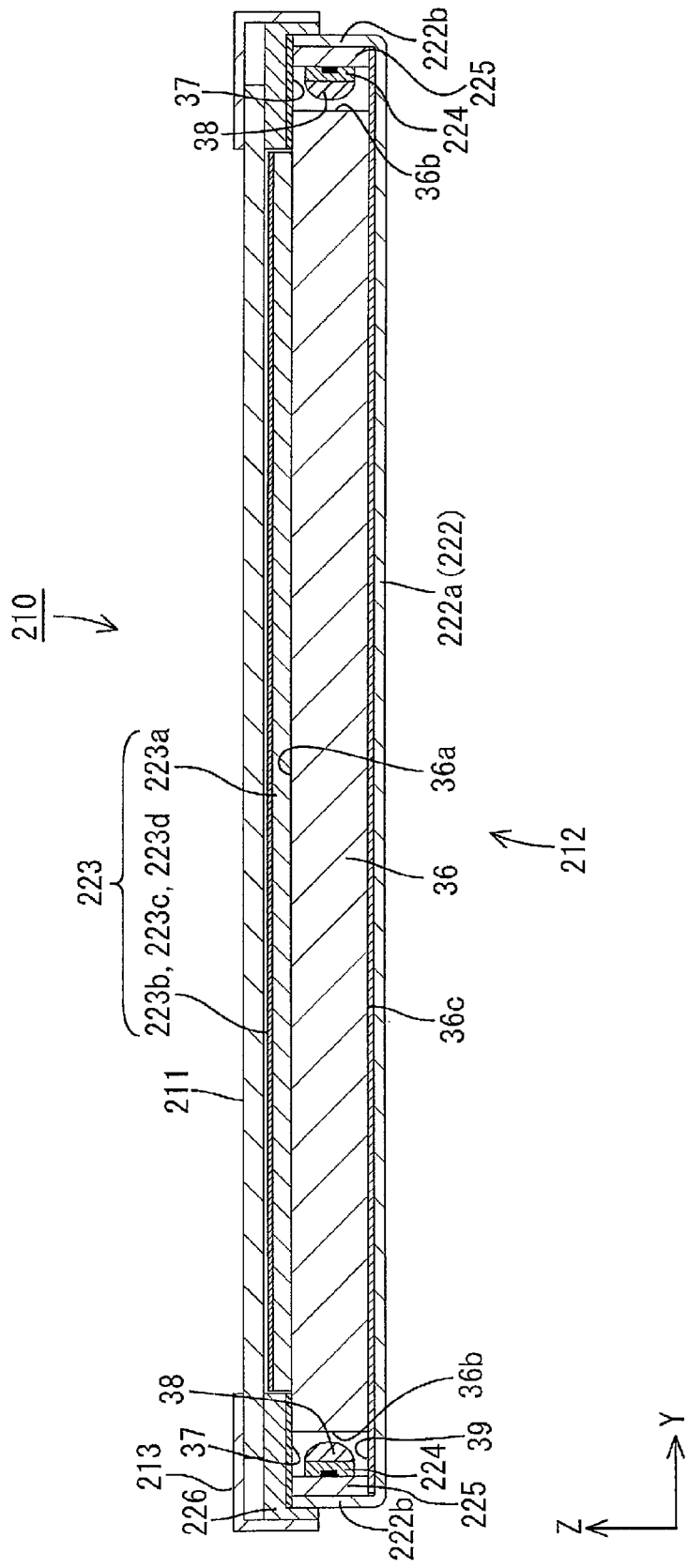
FIG. 17 is a cross sectional view showing a cross sectional configuration of the liquid crystal display device of FIG. 16, along a short side direction thereof.
Figure 18:
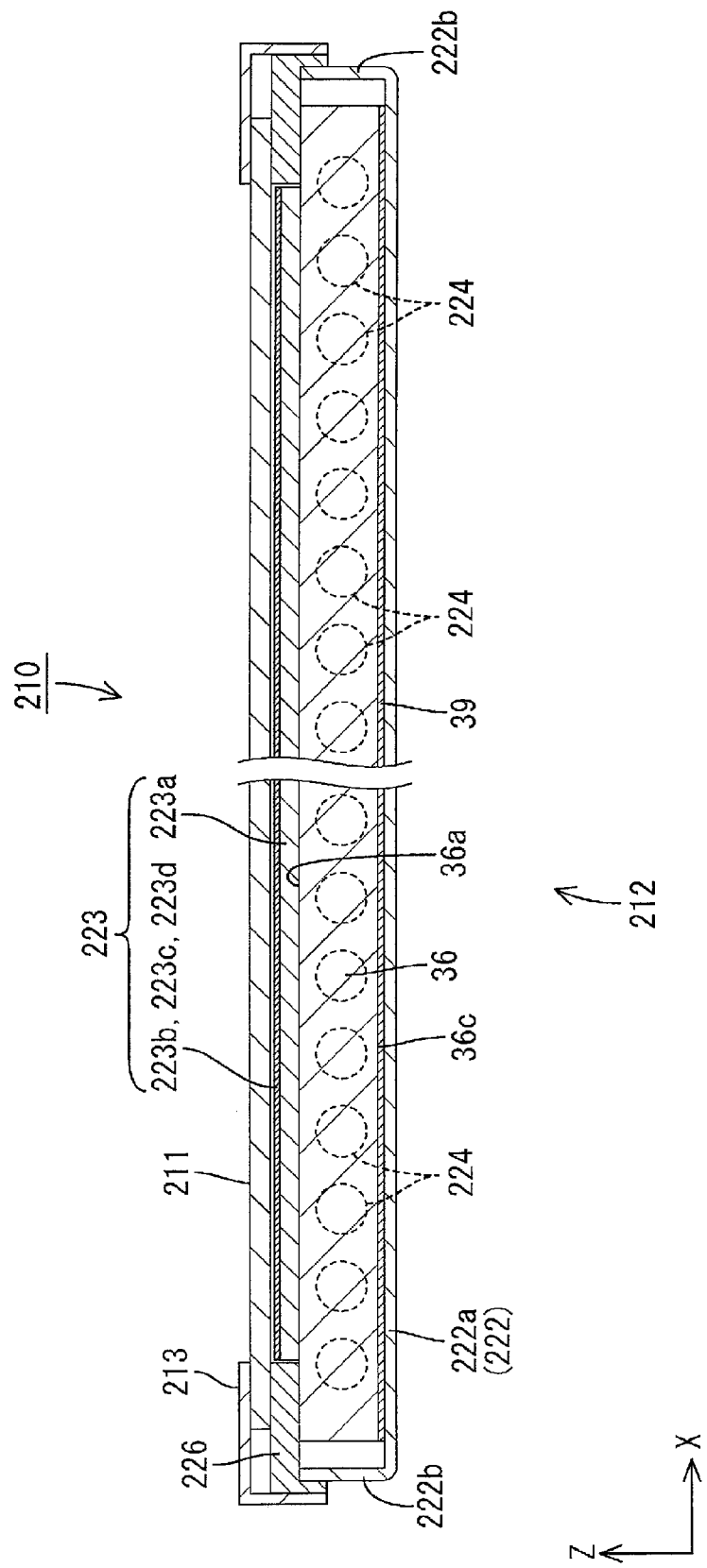
FIG. 18 is a cross sectional view showing a cross sectional configuration of the liquid crystal display device of FIG. 16, along a long side direction thereof.

The chassis 222 is made of metal and, as shown in FIGS. 17 and 18, includes a bottom plate 222a with a horizontally long square shape similar to the liquid crystal panel 211, and side plates 222b rising from the outer ends of the sides of the bottom plate 222a. Thus, the chassis 222 as a whole has a shallow, substantially box-like shape with an opening on the front side. The chassis 222 (bottom plate 222a) has a long side direction aligned with the X-axis direction (horizontal direction) and a short side direction aligned with the Y-axis direction (vertical direction). To the side plates 222b, the frame 226 and the bezel 213 can be threadably attached.

The optical members 223, as shown in FIG. 16, include a diffuser plate 223a disposed on the rear side (the side of the LEDS 224; opposite to the light output side), and optical sheets 223b to 223d disposed on the front side (the side of the liquid crystal panel 211; the light output side). The diffuser plate 223a is similar to the diffuser plate according to the first embodiment; thus, redundant description will be omitted. The optical sheets 223b to 223d are layered in the order of the diffuser sheet 223b, the reflection type polarizing sheet 223d, and the prism sheet 223c from the rear side (the side of the diffuser plate 223a). With regard to the diffuser sheet 223b and the prism sheet 223c, the chromaticity of the color of white of the transmitted light may be stabilized by including the chromaticity stabilizing step in the manufacturing method as described above with reference to the first embodiment and the second embodiment, before the diffuser sheet 223b or the prism sheet 223c is assembled and used in the backlight unit 212. Also with regard to the reflection type polarizing sheet 223d, a step of stabilizing chromaticity may be included in the manufacturing method as in the case of the diffuser sheet 223b and the prism sheet 223c.

The frame 226 has a frame-like shape extending along the outer peripheral ends of the light guide member 36 to retain substantially the entire peripheral ends of the light guide member 36 from the front side. The frame 226 is made of a synthetic resin and has a black surface, for example, providing light blocking property. On the rear side surfaces of both the long side portions of the frame 226, which faces the light guide member 36 and the LED boards 225 (LEDs 224), each one of first reflection sheets 37 reflecting light are attached, as shown in FIG. 17. The first reflection sheets 37 are sized to extend along substantially the entire length of the long side portions of the frame 226. In addition, the first reflection sheets 37 are directly abutted on the end portions of the light guide member 36 on the LED 224 side. Thus, the first reflection sheets 37 cover both the end portions of the light guide member 36 and the LED boards 225 altogether from the front side. The frame 226 is configured to receive the outer peripheral end portions of the liquid crystal panel 211 from the rear side.

Figure 19:
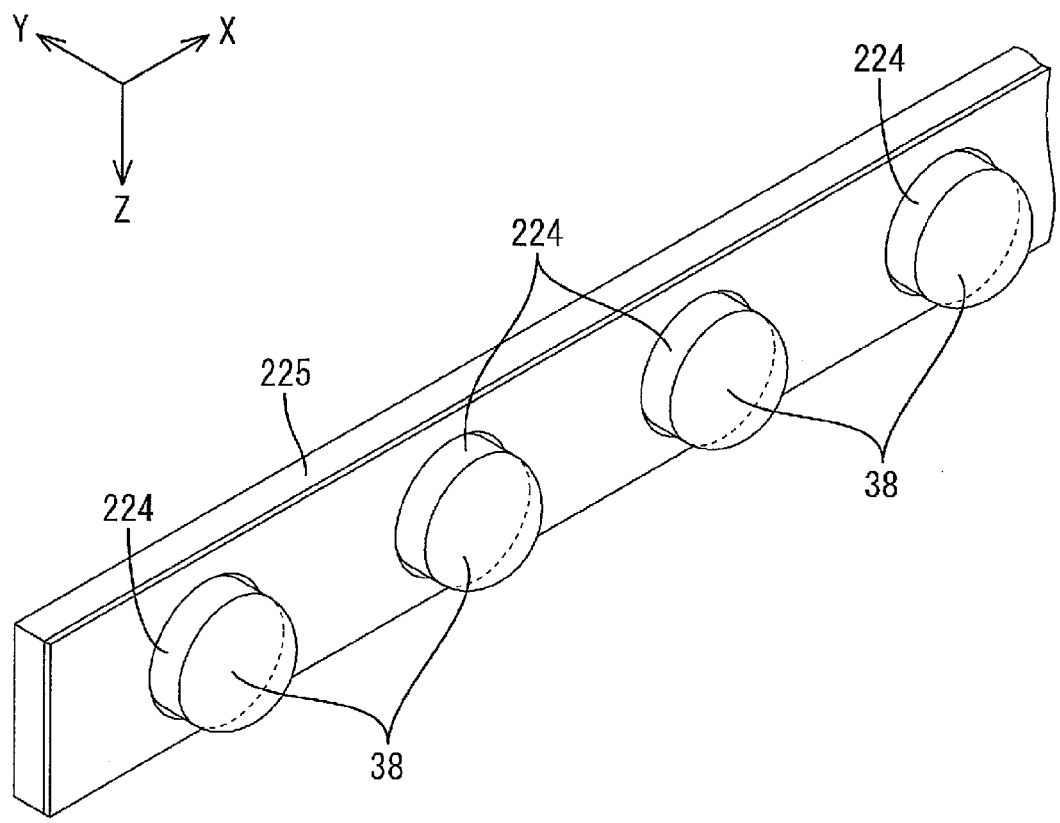
FIG. 19 is an enlarged perspective view of an LED board.

The LEDs 224 are mounted on the LED boards 225, as shown in FIG. 16 with the light emitting surface on the opposite side of the LED-mounting surface, that is the so-called top type. On the light emitting surface side of the LEDs 224, lens members 38 outputting light while diffusing it at large angles are provided, as shown in FIGS. 17 and 19. The lens members 38 are interposed between the LEDs 24 and light incident surfaces 36b of the light guide member 36. The lens members 38 have a spherical light output surface to be convex toward the light guide member 36. The light output surface of the lens members 38 is curved along the length direction of the light incident surfaces 36b of the light guide member 36 to have a substantially circular cross section. The configuration of the LEDs 224 may be similar to the first embodiment and redundant description will be omitted.

The LED boards 225, as shown in FIG. 16, have a thin plate-like shape extending along the long side direction (the X-axis direction; the longitudinal direction of the light incident surfaces 36b of the light guide member 36) of the chassis 222, with main plate surfaces parallel with the X-axis direction and the Z-axis direction. Specifically, the LED boards 225 are housed in the chassis 222 with their plate surfaces orthogonal to the plate surfaces of the liquid crystal panel 211 and the light guide member 36 (the optical members 223). The LED boards 225 are arranged as a pair, one at each end of the chassis 222 on the long side thereof, respectively to be attached to the inner surfaces of the side plates 222b on the long side. The LEDs 224 are surface-mounted on the main plate surfaces or the inner side of the LED boards 225, i.e., the surface facing the light guide member 36. Specifically, a plurality of the LEDs 224 is arranged side by side in a line on the mounting surface of the LED boards 225 along the length direction thereof (X-axis direction). In other words, a plurality of the LEDs 224 is arranged side by side on each of the end portions of the backlight unit 212 on the long sides along the long side direction. Because the pair of the LED boards 225 is housed in the chassis 222 with the mounting surfaces for the LEDs 224 opposed to each other, the light emitting surfaces of the LEDs 224 mounted on the LED boards 225 are opposed to each other, with the optical axes of the LEDs 224 substantially aligned with the Y-axis direction.

The base member of the LED boards 225 may be made of the same metal material as the chassis 222, such as aluminum based material. On the surface of the base member, a wiring pattern (not shown) of a metal film, such as copper foil, is formed via an insulating layer. On the outer-most surface of the base member, a white reflective layer (not shown) with excellent light reflectivity is formed. The LEDs 224 arranged side by side in a line on the LED boards 225 are connected in series by the wiring pattern. As the material of the base member of the LED boards 225, an insulating material, such as ceramic material, may be used.

The light guide member 36 will be described in detail. The light guide member 36 is made of a substantially transparent (highly light transmissive) synthetic resin material (such as acrylic) with a refractive index sufficiently higher than that of air. The light guide member 36, as shown in FIG. 16, has a horizontally long square shape in plan view similar to the liquid crystal panel 211 and the chassis 222, with the long side direction aligned with the X-axis direction and the short side direction aligned with the Y-axis direction. The light guide member 36 is arranged immediately under the liquid crystal panel 211 and the optical members 223 in the chassis 222 in a sandwiching manner with respect to the Y-axis direction between the pair of LED boards 225 arranged at the ends of the chassis 222 on the long sides. Thus, the arrangement direction of the LEDs 224 (LED boards 225) and the light guide member 36 is aligned with the Y-axis direction, while the arrangement of the optical members 223 (the liquid crystal panel 211) and the light guide member 36 is aligned with the Z-axis direction, the directions of both arrangement being orthogonal to each other. The light guide member 36 has the function of making the light emitted by the LEDs 224 in the Y-axis direction incident thereon and directing the light upward to output toward the optical members 223 (the Z-axis direction) while allowing the light to travel within the light guide member 36. The light guide member 36 is a little larger than the optical members 223 such that the outer peripheral end portions of the light guide member 36 extend outward beyond the outer peripheral end surfaces of the optical members 223, where is retained by the frame 226 (FIGS. 17 and 18).

The light guide member 36 has a substantially flat plate-like shape, which extends along the plate surfaces of the bottom plate 222a of the chassis 222 and the optical members 223, with main plate surfaces parallel with the X-axis direction and the Y-axis direction. The front-side one of the main plate surfaces of the light guide member 36 constitutes a light output surface 36a, from which the internal light is output toward the optical members 223 and the liquid crystal panel 211. Of the outer peripheral end surfaces adjacent to the main plate surfaces of the light guide member 36, the elongated end surfaces on the long sides extending along the X-axis direction are opposite to the LEDs 224 (the LED boards 225) with a predetermined interval therebetween; namely, the longitudinal end surfaces constitute light incident surfaces 36b, on which the light emitted by the LEDs 224 is incident. The light incident surfaces 36b are parallel to the X-axis direction and the Z-axis direction and substantially orthogonal to the light output surface 36a. The arrangement direction of the LEDs 224 and the light incident surfaces 36b is aligned with the Y-axis direction and parallel to the light output surface 36a. The light guide member 36 has a surface 36c opposite to the light output surface 36a, which is entirely covered with a second reflection sheet 39 reflecting the light within the light guide member 36 upward toward the front side. The second reflection sheet 39 extends to areas overlapping with the LED boards 225 (LEDs 224) in plan view to sandwich the LED boards 225 (LEDs 224) with the first reflection sheets 37 on the front side. Thus, the light from the LEDs 224 is repeatedly reflected between the reflection sheets 37 and 39, thereby causing the light to be incident on the light incident surfaces 36b efficiently. At least one of the light output surface 36a and the opposite surface 36c of the light guide member 36 is patterned with a reflecting portion (not shown) reflecting the internal light or a scattering portion (not shown) scattering the internal light, and thereby the output light from the light output surface 36a is controlled to have a uniform in-plane distribution.

By including the chromaticity stabilizing step in the method of manufacturing the optical members 223 used in the edge light backlight unit 212, the display quality of the liquid crystal panel 211 can be increased as in the case of the first embodiment.

<Fourth Embodiment>

A fourth embodiment of the present invention will be described with reference to FIG. 20 or 21. In the fourth embodiment, a color filter 319 of a liquid crystal panel 311 has three colors. Redundant description of structures, operations, and effects similar to those of the first embodiment will be omitted.

Figure 20:
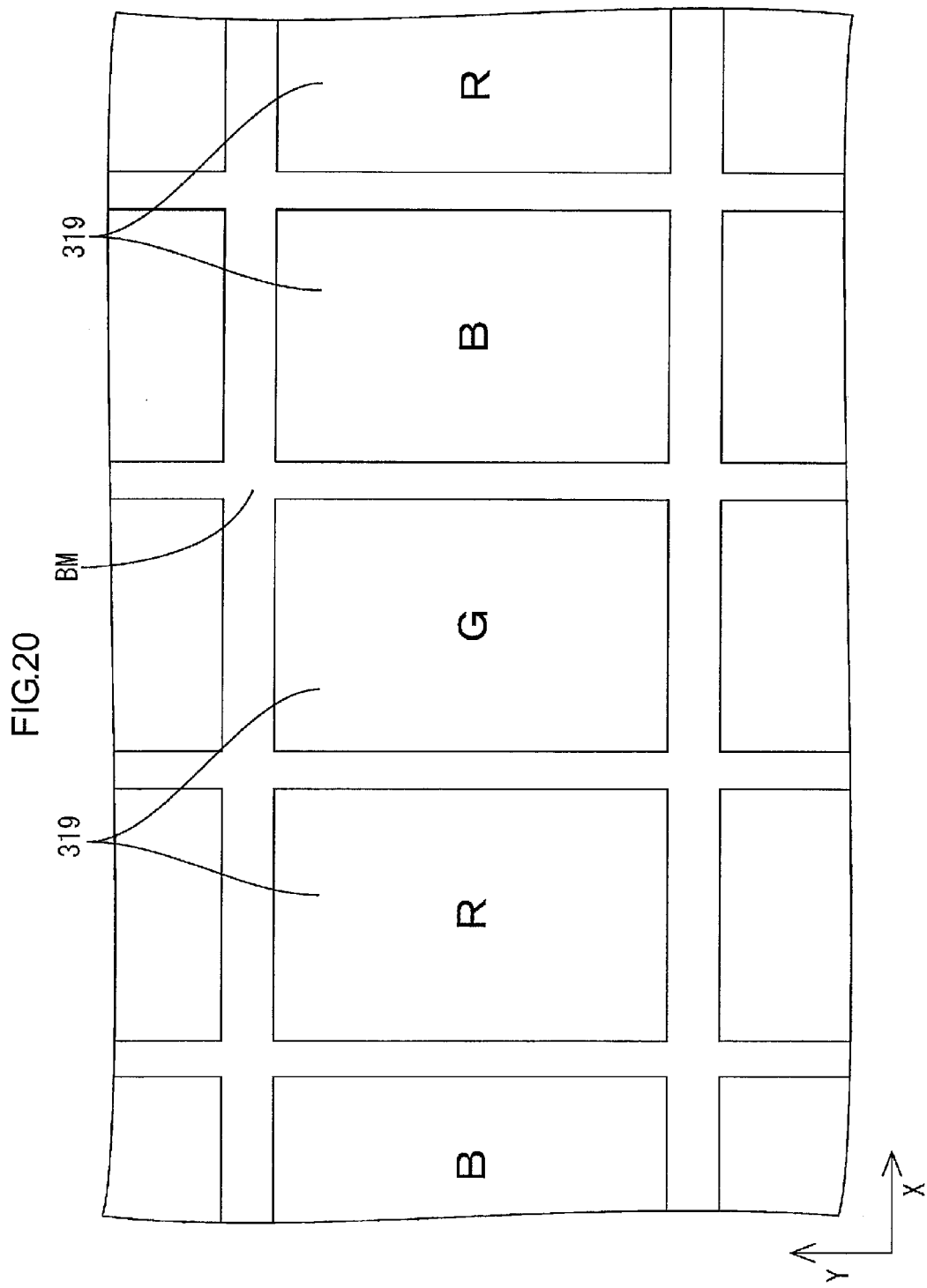
FIG. 20 is an enlarged plan view showing a planar configuration of a CF substrate according to a fourth embodiment of the present invention.
Figure 21:
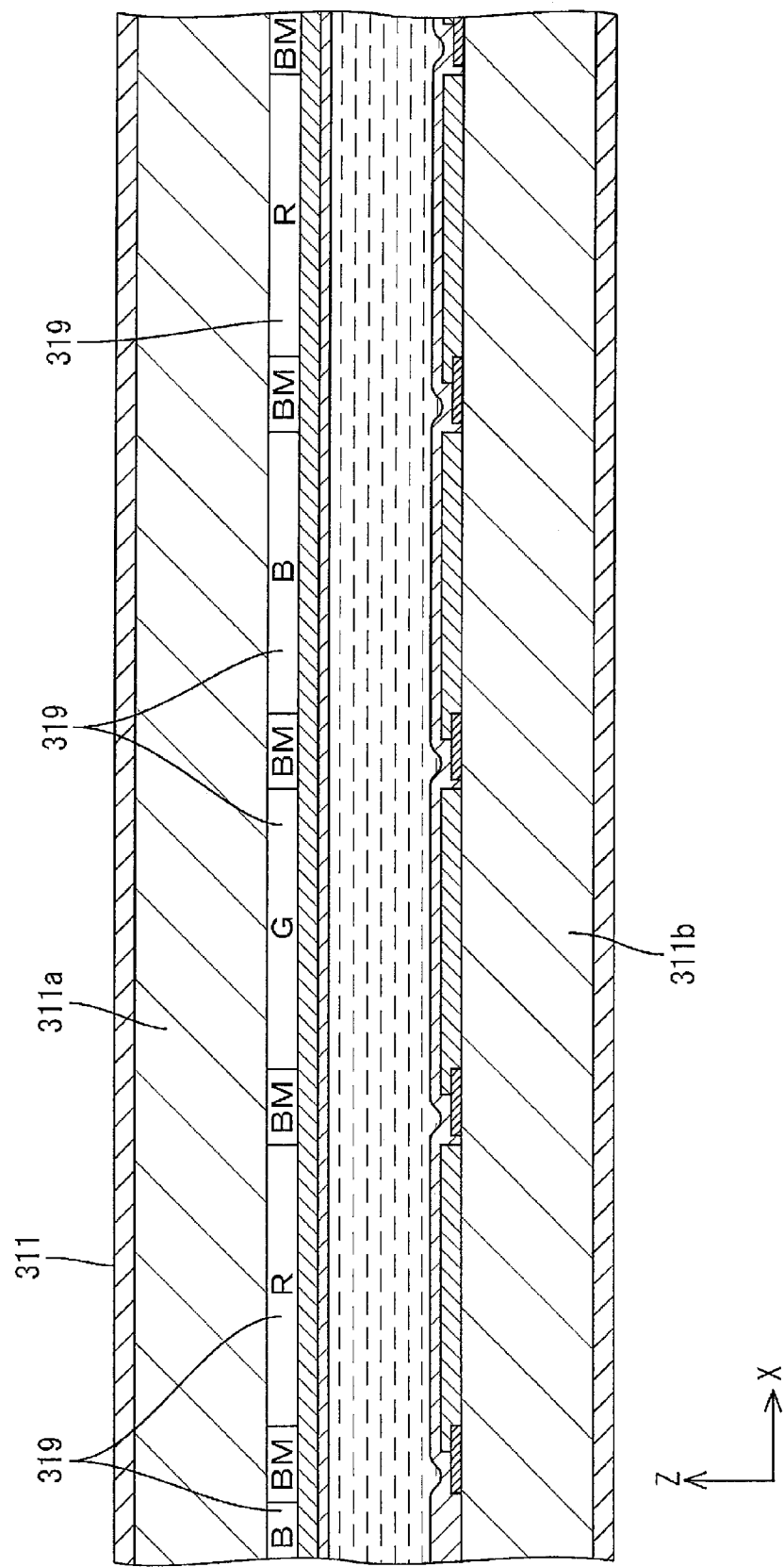
FIG. 21 is a cross sectional view showing a cross sectional configuration of a liquid crystal panel including the CF substrate of FIG. 20 along a long side direction.

As shown in FIGS. 20 and 21, a CF substrate 311a of the liquid crystal panel 311 according to the present embodiment is provided with the color filter 319 including a number of color sections R, G, or B arranged in a matrix corresponding to the pixels on the side of an array substrate 311b. The color filter 319 includes three kinds of color sections; namely, the red color section R; the green color section G; and the blue color section B, corresponding to the three primary colors of light. In the color filter 319, the color sections are arranged in the order of the red color section R, the green color section G, and the blue color section B repeatedly from the left of FIG. 20 along the X-axis direction. The color sections R, G, and B have a vertically long (elongated) square (rectangular) shape with a long side direction aligned with the Y-axis direction and a short side direction aligned with the X-axis direction, and have the same area for all of the colors. Between the color sections R, G, and B, a lattice-shaped light blocking layer (black matrix) BM preventing the mixing of colors is provided. In other respects, the present embodiment is similar to the first embodiment; thus, redundant description will be omitted. By including a step of stabilizing chromaticity in the method of manufacturing the optical members 23 to be used in the backlight unit 12 to be assembled onto the back surface of the liquid crystal panel 311 of the three primary color type, the display quality of the liquid crystal panel 311 can be increased as in the first embodiment.

<Other Embodiments>

The present invention is not limited to the embodiments above described and illustrated with reference to the drawings, and the following embodiments may be included in the technical scope of the present invention.

Figure 22:
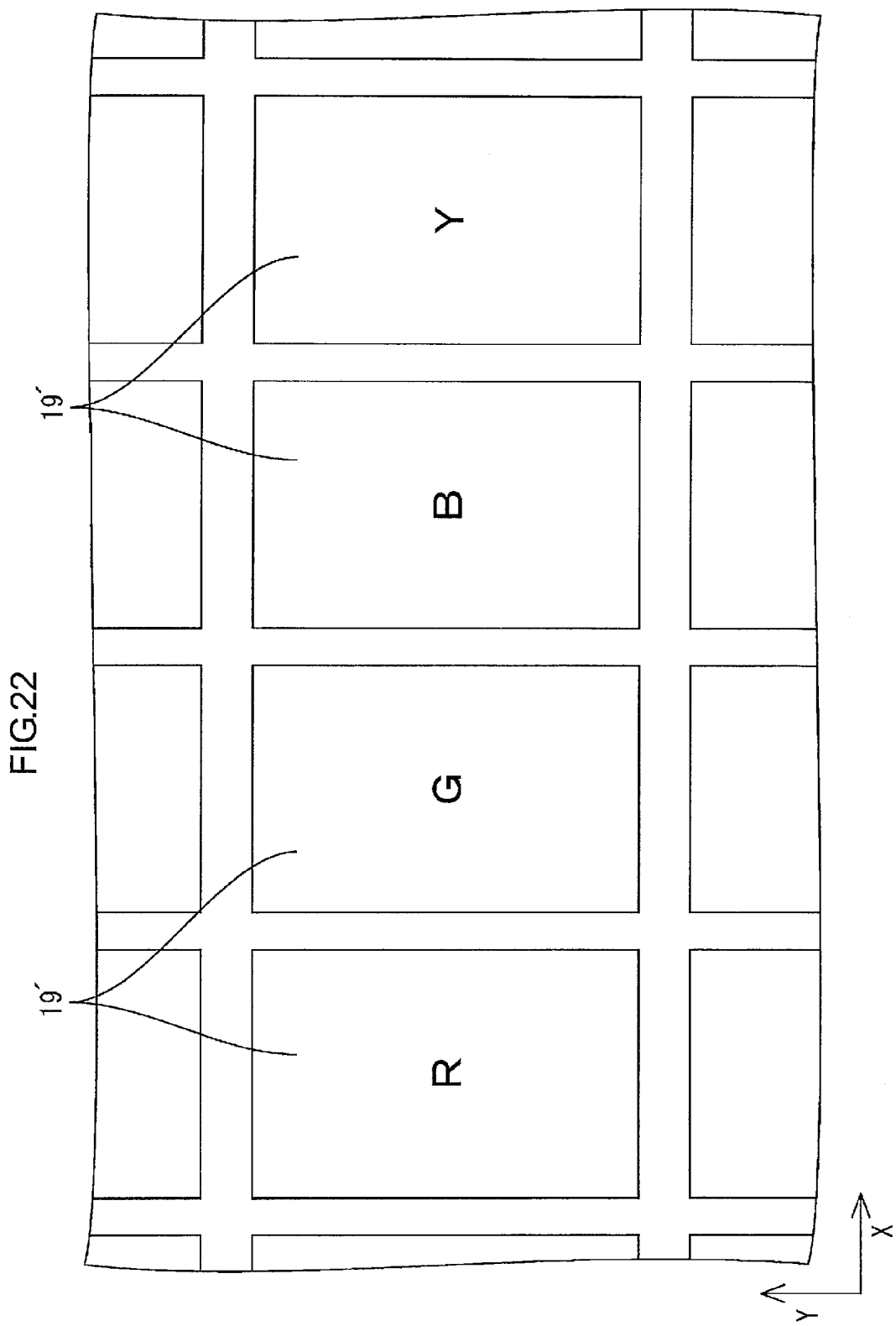
FIG. 22 is an enlarged plan view showing a planar configuration of a CF substrate according to another embodiment (1) of the present invention.

(1) The order of arrangement of the color sections in the color filter of the liquid crystal panel of four original color type may be appropriately modified, other than that according to the first embodiment. For example, as shown in FIG. 22, the present invention includes a configuration in which the color sections R, G, B, and Y in a color filter 19' are arranged in the order of the red color section R, the green color section G, the blue color section B, and the yellow color section Y from the left of the figure along the X-axis direction. The order of arrangement of the color sections R, G, and B of the liquid crystal panel of the three primary color type according to the fourth embodiment may also be modified.

(2) Other than (1), the present invention includes a configuration in which, as shown in FIG. 23, the color sections R, G, B, and Y in a color filter 19" are arranged in the order of the red color section R, the yellow color section Y, the green color section G, and the blue color section B from the left of the figure along the X-axis direction.

(3) In the method of manufacturing an optical member according to the foregoing embodiments, the chromaticity stabilizing step is performed after the base member forming step and the functional layer forming step. However, the order of performing the steps may be modified such that, for example, the functional layer forming step is performed after the base member forming step and the chromaticity stabilizing step. Namely, the light transmissive base member is formed first, and then, prior to forming the optical functional layer, only the light transmissive base member is irradiated with the light from the chromaticity stabilizing light source.

(4) In the foregoing embodiments, the chromaticity stabilizing LEDs are opposite to the light transmissive base member among the optical members in the chromaticity stabilizing step. However, the present invention may include a configuration in which the chromaticity stabilizing LEDs are opposite to the optical functional layer among the optical members.

(5) In the foregoing embodiments, the chromaticity stabilizing LEDs are opposite to only one side of the optical members in the chromaticity stabilizing step. However, the present invention may include a configuration in which a pair of the chromaticity stabilizing LEDs is disposed on both sides of the optical members.

(6) In the foregoing embodiments, the chromaticity stabilizing LEDs used in the chromaticity stabilizing step have the same dominant emission wavelength of the LEDs of the backlight unit. However, the present invention may also include a configuration in which the dominant emission wavelength of the chromaticity stabilizing LEDs is made different from the dominant emission wavelength of the LEDs of the backlight unit (other than 451 nm in a range of 435 nm to 480 nm). Also in this case, the dominant emission wavelength of the chromaticity stabilizing LEDs may be selected preferably from a range of 440 nm to 460 nm.

(7) Conversely from the above (6), the dominant emission wavelength of the LEDs of the backlight unit may be made different from the dominant emission wavelength of the chromaticity stabilizing LEDs.

(8) In the foregoing embodiments, the chromaticity stabilizing LEDs are used as the chromaticity stabilizing light sources in the chromaticity stabilizing step. However, the present invention may also include a configuration in which other types of light source (such as a xenon lamp) are used as the chromaticity stabilizing light sources.

(9) In the foregoing embodiments, the chromaticity stabilizing LEDs used in the chromaticity stabilizing step emit the single color light of blue. However, with respect to the chromaticity stabilizing LEDs, it is also possible to use LEDs that have a plurality of peak wavelengths in the blue wavelength region, or LEDs that have a peak wavelength in a wavelength region other than and in addition to the blue wavelength region. In other words, some of the light emitted by the chromaticity stabilizing LEDs may belong to a wavelength region other than the blue wavelength region as long as the light has the dominant emission wavelength in the blue wavelength region; namely, as long as the light has the highest emission intensity in the blue wavelength region.

(10) In the foregoing embodiments, the emission intensity of the light in the blue wavelength region from the chromaticity stabilizing LEDs used in the chromaticity stabilizing step is relatively higher than the corresponding emission intensity of the LEDs of the backlight unit. However, the chromaticity stabilizing LEDs and the LEDs of the backlight unit may have the same emission intensity.

(11) In the first embodiment, the light transmissive base member and the prism layer of the prism sheet are made of different materials. However, the light transmissive base member and the prism layer may be made of the same material. In this case, in the prism layer forming step, the prism layer is formed by pressing a die of a prism shape directly onto the surface of the light transmissive base member obtained through the base member forming step.

(12) The material of the light transmissive base member of the prism sheet may be modified as appropriate. For example, the material may be the same AS resin as the diffuser sheet. Alternatively, an acrylic resin, PS (polystyrene), or PP (polypropylene) may be used. Similarly, the material of the prism layer may be modified as appropriate.

(13) In the second embodiment, the diffuser layer is formed by applying the diffusing agent onto the surface of the light transmissive base member of the diffuser sheet. Alternatively, the diffuser sheet may be manufactured by initially forming a diffuser layer on a surface of a transparent film separate from the light transmissive base member, and then affixing the film onto the light transmissive base member.

(14) Other than the above (13), the diffuser sheet may be manufactured by mixing diffusing beads in the light transmissive base member in a dispersed manner.

(15) The material of the light transmissive base member of the diffuser sheet may be modified as appropriate. For example, the material may be the same polyester resin (such as PET) as the prism sheet. Alternatively, an acrylic resin, PS (polystyrene), or PP (polypropylene) maybe used. Similarly, the material of the diffuser layer may be modified as appropriate.

(16) In the foregoing embodiments, the chromaticity stabilizing step is included in the method of manufacturing the optical sheets of the optical members. Alternatively, the chromaticity stabilizing step may be included in the method of manufacturing a diffuser plate or a light guide member, and such a configuration is also included in the present invention. Also in this case, particularly high effect can be obtained when the material of the optical members is polyester resin (such as PET).

(17) In the first embodiment, the optical sheets used in the direct backlight unit include two sheets, i.e., the diffuser sheet and the prism sheet. It is of course possible to include three optical sheets by adding a reflection type polarizing sheet, or four or more optical sheets by adding other types of optical sheets. It is also possible to use a plurality of optical sheets of the same type, such as two diffuser sheets.

(18) In the third embodiment, three optical sheets are used in the edge light backlight unit, i.e., the diffuser sheet, the prism sheet, and the reflection type polarizing sheet. It is also possible to use four or more optical sheets by adding other types of optical sheets, or, conversely, use two or less optical sheets by omitting any of the above optical sheets. It is also possible to use a plurality of optical sheets of the same type, such as two diffuser sheets.

(19) In the first embodiment, the diffuser lens is disposed on the light output side of the LEDs. However, the present invention may be applied to a direct backlight unit without such diffuser lens.

(20) In the foregoing embodiments, the liquid crystal panel and the chassis are vertically arranged with their short side directions aligned with the vertical direction, by way of example. The present invention also includes a configuration in which the liquid crystal panel and the chassis are vertically arranged with their long side directions aligned with the vertical direction.

(21) In the foregoing embodiments, as the switching elements of the liquid crystal display device, TFTs are used. The present invention, however, may be applied to liquid crystal display devices using switching elements other than TFTs (such as thin-film diodes (TFDs)). Further, the present invention may be applied not only to a liquid crystal display device for color display but also to a liquid crystal display device for monochrome display.

(22) While in the foregoing embodiments liquid crystal display devices using a liquid crystal panel as a display panel has been described by way of example, the present invention may be applied to display devices using other types of display panels.

(23) While in the foregoing embodiments a television receiver with a tuner has been described by way of example, the present invention may be applied to a display device without a tuner.

EXPLANATION OF SYMBOLS 11, 211, 311: Liquid crystal display device (Display device)
11a, 311a: CF substrate (Substrate)
11b, 311b: Array substrate (Substrate)
11c: Liquid crystal layer (Substance)
12, 212: Backlight unit (Lighting device)
19, 319: Color filter
23, 223: Optical member
23b, 223b: Diffuser sheet (Optical member)
23c, 223c: Prism sheet (Optical member)
223d: Reflection type polarizing sheet (Optical member)
24, 224: LED (Light source)
30: Light transmissive base member
31: Prism layer (Optical functional layer)
32: Chromaticity stabilizing LEDs (Chromaticity stabilizing light source)
34: Light transmissive base member
35: Diffuser layer (Optical functional layer)
R: Red color section
G: Green Color section
B: Blue Color section
Y: Yellow Color section

The invention claimed is:

1. A method of manufacturing an optical member to be used in a lighting device supplying light to a display panel and transmitting light from a light source included in the lighting device, the method comprising:
   irradiating the optical member with light having a dominant emission wavelength in a blue wavelength region that is emitted from a chromaticity stabilizing light source to stabilize the chromaticity of light transmitted through the optical member.

2. The method of manufacturing an optical member according to claim 1, wherein in the chromaticity stabilizing step, the light having the dominant emission wavelength in the blue wavelength region that is emitted from the chromaticity stabilizing light source has an emission intensity relatively higher than an emission intensity of a light source included in the lighting device.

3. The method of manufacturing an optical member according to claim 2, wherein in the chromaticity stabilizing step, the dominant emission wavelength of the chromaticity stabilizing light source is same as a dominant emission wavelength of the light source included in the lighting device.

4. The method of manufacturing an optical member according to claim 1, wherein in the chromaticity stabilizing step, the chromaticity stabilizing light source emits single color blue light.

5. The method of manufacturing an optical member according to claim 4, wherein in the chromaticity stabilizing step, the chromaticity stabilizing light source is a chromaticity stabilizing LED having a LED element emitting the single color blue light.

6. The method of manufacturing an optical member according to claim 1, further comprising forming a light transmissive base member of the optical member, wherein in the chromaticity stabilizing step, at least the light transmissive base member is irradiated with the light from the chromaticity stabilizing light source.

7. The method of manufacturing an optical member according to claim 6, wherein in the base member forming step, the light transmissive base member is formed from a polyester resin.

8. The method of manufacturing an optical member according to claim 7, wherein in the base member forming step, the light transmissive base member is formed from PET (polyethylene terephthalate).

9. The method of manufacturing an optical member according to claim 6, wherein in the base member forming step, the light transmissive base member is formed from an AS resin (acrylonitrile-styrene copolymer).

10. The method of manufacturing an optical member according to claim 6, further comprising forming an optical functional layer on the light transmissive base member, the optical functional layer optically affecting the light from the light source of the lighting device.

11. The method of manufacturing an optical member according to claim 10, wherein the chromaticity stabilizing step is performed after the base member forming step and the functional layer forming step.

12. The method of manufacturing an optical member according to claim 11, wherein in the chromaticity stabilizing step, the chromaticity stabilizing light source is disposed to face at least the light transmissive base member.

13. The method of manufacturing an optical member according to claim 12, wherein in the chromaticity stabilizing step, the chromaticity stabilizing light source is disposed to face the light transmissive base member between the light transmissive base member and the optical functional layer.

14. The method of manufacturing an optical member according to claim 10, wherein the optical functional layer is a prism layer that collects the light from the light source of the lighting device.

15. The method of manufacturing an optical member according to claim 14, wherein the prism layer is made of a non-halogenated acrylic resin.

16. The method of manufacturing an optical member according to claim 10, wherein the optical functional layer is a diffuser layer diffusing light from the light source of the lighting device.

17. The method of manufacturing an optical member according to claim 16, wherein the diffuser layer is made of an alkyl methacrylate styrene non-copolymer.

18. The method of manufacturing an optical member according to claim 1, wherein in the chromaticity stabilizing step, the light from the chromaticity stabilizing light is irradiated onto the optical member to be used in the lighting device including the light source configured with a LED having a LED element emitting single color blue light and a phosphor emitting light upon excitation by the light from the LED element.

19. The method of manufacturing an optical member according to claim 1, wherein in the chromaticity stabilizing step, the light from the chromaticity stabilizing light is irradiated onto the optical member to be used in the lighting device supplying light to the display panel including a pair of substrates sandwiching a substance with optical characteristics variable by application of an electric field, one of the pair of substrates including a color filter with a plurality of color sections respectively exhibiting blue, green, red, or yellow.

* * * * *